United States Patent
Jackson et al.

(10) Patent No.: US 10,055,029 B2
(45) Date of Patent: Aug. 21, 2018

(54) INPUT DEVICE

(71) Applicant: Cojac Limited, Southport (GB)

(72) Inventors: Rodney Philip Jackson, Southport (GB); John Biddleston, Rotherham (GB)

(73) Assignee: COJAC LIMITED, Southport (GB)

( * ) Notice: Subject to any disclaimer, the term of this patent is extended or adjusted under 35 U.S.C. 154(b) by 90 days.

(21) Appl. No.: 15/034,168

(22) PCT Filed: Nov. 11, 2014

(86) PCT No.: PCT/GB2014/053348
§ 371 (c)(1),
(2) Date: May 3, 2016

(87) PCT Pub. No.: WO2015/071655
PCT Pub. Date: May 21, 2015

(65) Prior Publication Data
US 2016/0328033 A1    Nov. 10, 2016

(30) Foreign Application Priority Data

Nov. 12, 2013 (GB) .................................. 1319970.8
Feb. 20, 2014 (GB) .................................. 1403026.6
Oct. 23, 2014 (GB) .................................. 1418906.2

(51) Int. Cl.
*G06F 3/0354* (2013.01)
(52) U.S. Cl.
CPC ........ *G06F 3/03544* (2013.01); *G06F 3/0354* (2013.01)

(58) Field of Classification Search
None
See application file for complete search history.

(56) References Cited

U.S. PATENT DOCUMENTS

| | | |
|---|---|---|
| 2003/0058219 A1 | 3/2003 | Shaw |
| 2007/0257887 A1 | 11/2007 | Chang |
| 2009/0009474 A1 | 1/2009 | Delattre |
| 2010/0214223 A1* | 8/2010 | Jackson ................ G06F 3/0354 345/164 |

FOREIGN PATENT DOCUMENTS

| | | |
|---|---|---|
| GB | 2476837 A | 7/2011 |
| WO | 98/10373 A1 | 3/1998 |
| WO | 98/35315 A2 | 8/1998 |
| WO | 2007/026128 A2 | 3/2007 |

* cited by examiner

*Primary Examiner* — Nicholas J Lee
*Assistant Examiner* — Duane N Taylor, Jr.
(74) *Attorney, Agent, or Firm* — patenttm.us

(57) ABSTRACT

An input device (10) comprises a panning mechanism (12). The panning mechanism comprises a sensor arrangement having first and second sensor components (46, 48), a movable carrier arrangement (40) for carrying the first sensor component and a fixed carrier arrangement (42) on which the second sensor component is mounted. The movable carrier arrangement is movable relative to the fixed carrier arrangement. The panning mechanism further includes constraining means (50) to constrain movement of the movable carrier arrangement relative to the fixed carrier arrangement in two directions. The movement of the movable carrier arrangement relative to the fixed carrier arrangement effects movement of the first sensor component relative to the second sensor component to create input signals such as input signals for a data processing apparatus.

17 Claims, 27 Drawing Sheets

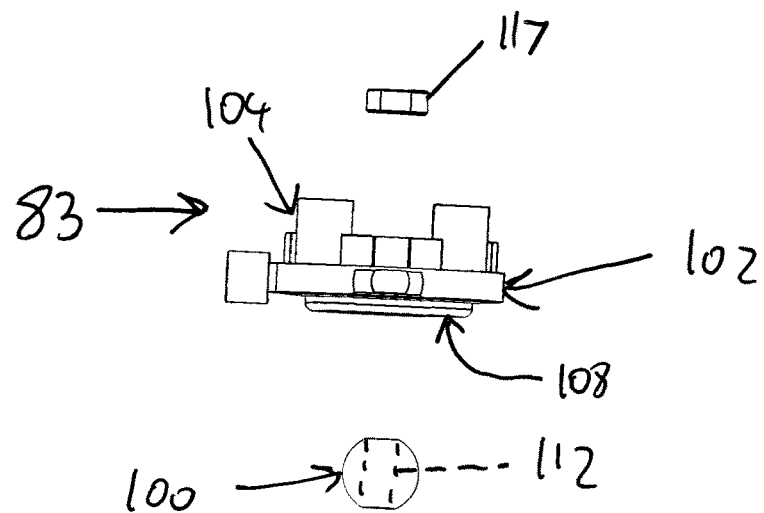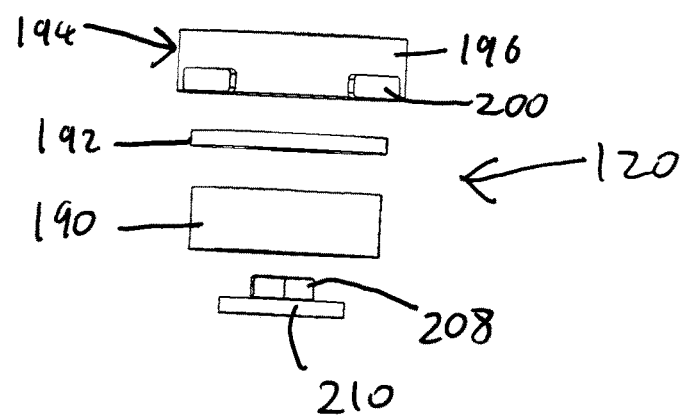
Fig 15
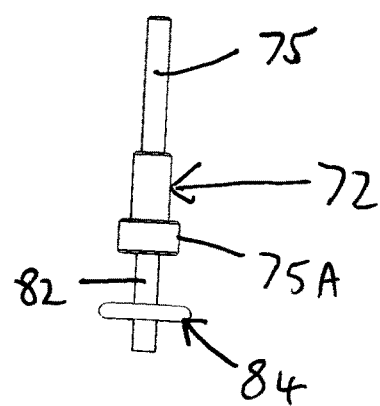

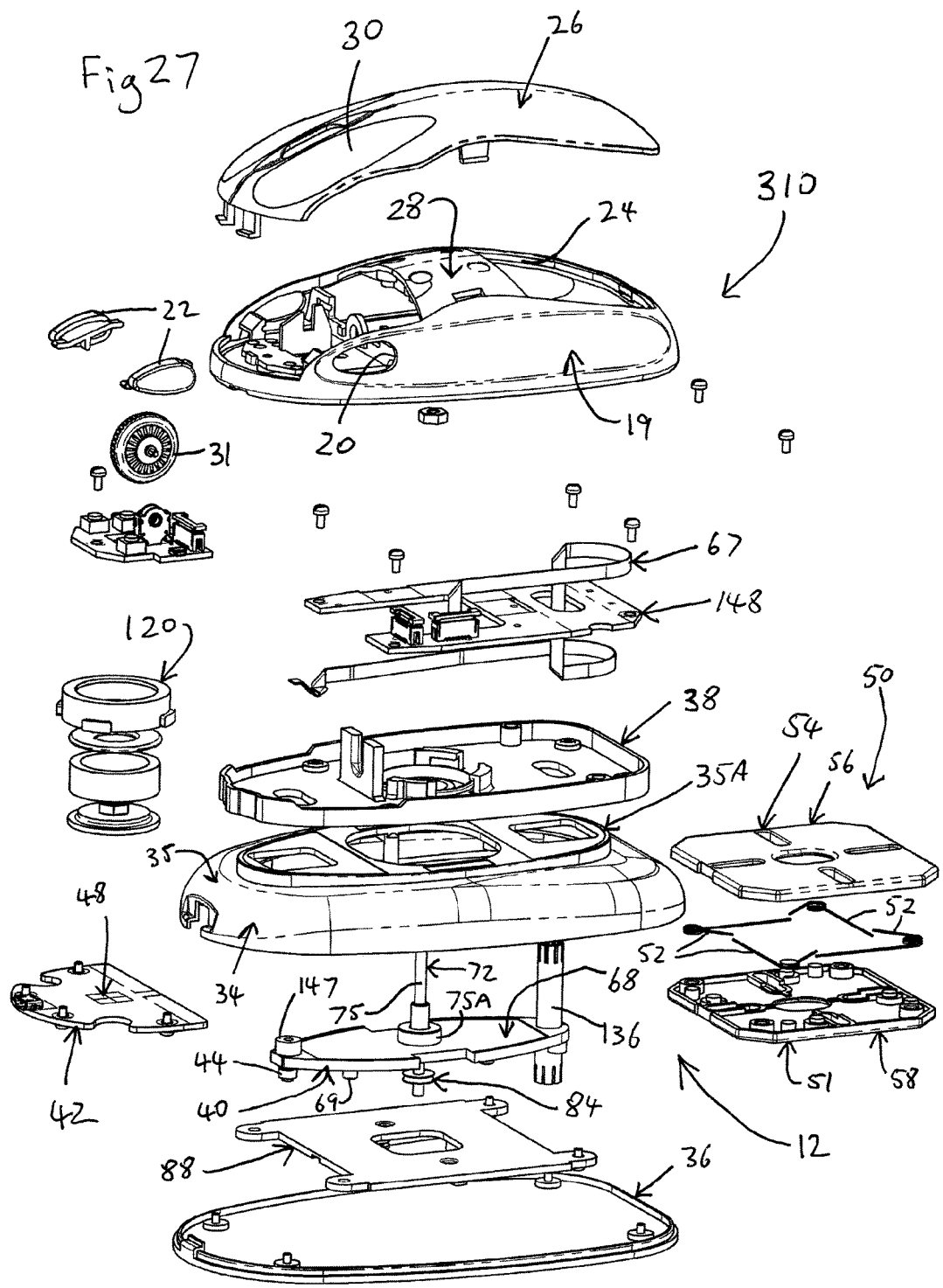

INPUT DEVICE

This invention relates to input devices. More particularly, but not exclusively, this invention relates to computer input devices. This invention also relates to panning mechanisms for input devices, such as computer input devices. This invention also relates to twisting mechanisms for input devices, such as computer input devices. This invention also relates to tilting mechanisms for input devices, such as computer input devices.

Computer input devices are well known. An example of such a device is a computer mouse. Computer input devices have been developed for more complex uses, such as gaming. However, these devices do not provide all the functions that might be needed for such complex use.

According to one aspect of this invention, there is provided a panning mechanism for an input device, the panning mechanism comprising a sensor arrangement having first and second sensor components, a movable carrier arrangement for carrying the first sensor component, a fixed carrier arrangement on which the second sensor component is mounted, the movable carrier arrangement being movable relative to the fixed carrier arrangement, and the panning mechanism further including constraining means to constrain movement of the movable carrier arrangement relative to the fixed carrier arrangement in two directions, whereby the movement of the movable carrier arrangement relative to the fixed carrier arrangement effects movement of the first sensor component relative to the second sensor component to create input signals, such as input signals for a data processing apparatus.

The input signals may be for controlling a device, for example for effecting movement of an image on a display, and/or for controlling movement of a device in the real world.

The panning mechanism may be for an input device for a data processing apparatus. The panning mechanism may be for a computer input device.

The constraining means may be configured to constrain movement of the movable carrier arrangement relative to the fixed carrier arrangement in two substantially perpendicular directions. The constraining means may be configured to constrain movement of the movable carrier arrangement relative to the fixed carrier arrangement in no more than two directions.

The constraining means may comprise a guide arrangement having two guide ways for guiding movement of the movable carrier arrangement relative to the fixed carrier arrangement. The guide ways may be substantially perpendicular to each other. The movable carrier arrangement may include a guide member configured to cooperate with one of the guide ways. The fixed carrier arrangement may comprise a further guide member configured to cooperate with the other guide way.

Each of the guide ways may be a guide slot defined by the guide arrangement. In one embodiment, the one of the guide ways may be a pair of collinear guide slots, and the other guide way may be a pair of collinear further guide slots.

In one embodiment, the movable carrier arrangement may comprise a pair of guide members, which may be cooperable with one of the guide ways. The, or each, guide member may comprise a peg. The fixed carrier arrangement may comprise a pair of further guide members, which may be cooperable with the other of the guide ways. The, or each, further guide member may comprise a peg.

The movable carrier arrangement may comprise a carrier member, which may be substantially flat. The, or each, guide member may extend from the carrier member.

The fixed carrier arrangement may comprise a housing and a base member. The, or each, further guide member may be provided on the housing or base member.

The constraining means may comprise a plurality of urging members operable on the guide members to urge the movable carrier arrangement to a substantially central position relative to the fixed carrier arrangement. The central position of the movable carrier arrangement relative to the fixed carrier arrangement is preferably a position where the first sensor component is located substantially centrally over the second sensor component.

Each urging member may comprise a spring. The constraining means may comprise a holder to hold the urging members. Each urging member may be operable between the holder and a respective one of the guide members.

In the embodiment described herein, the constraining means provides a return to zero arrangement for the panning mechanism, ensuring that the movable carrier arrangement is located centrally over the constraining means when the panning mechanism is not being operated.

One embodiment may comprise four urging members, each being operable between the holder and a respective one of the guide members. The movable carrier arrangement may further include a projecting arrangement and further urging members operable on the projecting arrangement. The projecting arrangement may comprise an elongate portion and a substantially circular member, the circular member being engagable with the further urging members to urge the projecting arrangement and the movable carrier arrangement to the aforesaid central position. The further urging members may be located beneath the holder.

The panning mechanism may comprise a housing in which the movable carrier arrangement and the fixed carrier arrangement are housed.

The panning mechanism may include an elongate shaft member extending upwardly from the movable carrier arrangement. The elongate shaft member may extend through a main aperture in a support arrangement, said support arrangement being desirably disposed above the movable carrier arrangement.

A stop member, which may be substantially circular, may be provided on the elongate shaft member to engage the edge of the aperture in the support arrangement, thereby providing a limit to the extent of movement of the movable carrier arrangement.

According to another aspect of this invention, there is provided a twisting mechanism for an input device, the twisting mechanism comprising a movable carrier arrangement, a support arrangement pivotally mounted on the movable carrier arrangement, a sensor holding arrangement, a sensor arrangement comprising a first sensor component held by the sensor holding arrangement and a second sensor component on the support arrangement, whereby pivoting movement of the support arrangement relative to the movable carrier arrangement causes relative movement of the support arrangement and the sensor holding arrangement, and thereby effects movement of the first sensor component relative to the second sensor component to create input signals, such as input signals for a data processing apparatus.

The input signals may be for controlling a device, for example for effecting movement of an image on a display, and/or for controlling movement of a device in the real world.

The twisting mechanism may be for an input device for a data processing apparatus. The twisting mechanism may be for a computer input device.

The twisting mechanism may comprise a slide arrangement to effect said relative movement between the support arrangement and the sensor holding arrangement. The aforesaid relative movement may be relative sliding movement. The slide arrangement may comprise a guide assembly on the support arrangement, and sensor holding arrangement, wherein the guide assembly and the sensor holding arrangement can slide relative to each other.

The movable carrier arrangement may include a retaining member for retaining the sensor holding arrangement in a substantially fixed position relative to the movable carrier arrangement. The movable carrier arrangement of the panning mechanism may constitute the movable carrier arrangement of the tilting mechanism. The retaining member may comprise an elongate post member extending from the movable carrier arrangement to the sensor holding arrangement. The support arrangement may define a first aperture through which the elongate post member can extend from the movable carrier arrangement.

The movable carrier arrangement may include a further elongate post member extending from the movable carrier arrangement to the support arrangement. The support arrangement may define a second aperture through which the further elongate post member can extend. The first and second apertures may be in the shape of curved slots, which may correspond to arcs of a circle or of concentric circles.

The centre of the aforesaid circle or concentric circles may correspond to the position of the elongate shaft member extending through the main aperture defined in the support means. Said elongate post member and said further elongate post member may be provided respectively at rearward and forward regions of the support arrangement.

The slide arrangement may comprise an urging assembly for urging the sensor holding arrangement and the guide assembly relative to each other so that the sensor holding arrangement is substantially centrally located in a central position within the guide assembly. The urging assembly may be cooperable with the guide assembly and the sensor holding arrangement to urge the sensor holding arrangement and the guide assembly relative to each other to the central position. The guide assembly may comprise opposite wall members and the sensor holding arrangement may be disposed between the opposite wall members. The urging assembly may be disposed between the wall members.

The guide assembly may further include end members, and the urging assembly may extend from the end members to the sensor holding arrangement. The urging assembly may comprise a spring assembly, which may comprise a pair of compression springs, each extending from a respective end member to the sensor holding arrangement.

The sensor holding arrangement may comprise a main sliding portion held within the guide assembly, and a carrier portion for carrying the first component of the sensor arrangement. The carrier portion may extend externally of the guide assembly.

The sensor holding arrangement may further include a pair of spring engaging members arranged within the guide assembly on opposite sides of the main sliding portion. The sensor holding arrangement may include stop members on the spring engaging members. The stop members may be received in slots or recesses defined by the guide assembly, the slots or recesses having end members to engage the stop members, and preventing movement of the stop members beyond the end portions.

The spring engaging members thus, in the embodiment described herein, provide a return to zero arrangement for the twisting mechanism, ensuring that the main sliding portion is disposed centrally within the guide member when the twisting mechanism is not being operated.

The twisting mechanism may further include a pivot assembly, which may comprise an upstanding member on the movable carrier arrangement, and a first pivot means on the upstanding member. The first pivot means may comprise a substantially spherical member. The pivot assembly may further include a second pivot means pivotally mounted on the first pivot means.

The second pivot means may be configured to receive the first pivot means. The second pivot means may comprise upper and lower pivot members, which may be secured to each other to hold the first pivot member. Each of the upper and lower pivot members may define a respective recess, wherein the recesses are aligned with each other when the upper and lower pivot members are secured to each other, whereby a space is defined by the upper and lower pivot members to receive the first pivot member.

The twisting mechanism may further include a cooperating arrangement between the second pivot means and the support arrangement, whereby pivoting movement of the second pivot means relative to the movable carrier arrangement effects corresponding movement of the support arrangement relative to the movable carrier arrangement. The cooperating arrangement may comprise a projection on the second pivot means and receiving means on the support arrangement to receive the projection, whereby twisting movement of the second pivot means causes the projection to engage the receiving means to effect twisting motion of the support arrangement.

The twisting mechanism may comprise a stop arrangement to limit the twisting movement of the twisting mechanism. The stop arrangement may comprise an aperture defined in the support arrangement. In one embodiment, the stop arrangement may comprise two apertures defined in the support arrangement. One of the apertures may be defined at a forward region of the support arrangement. The other of the apertures may be defined at a rear region of the support arrangement.

According to another aspect of this invention, there is provided a tilting mechanism for an input device, the tilting mechanism comprising a pivot assembly, and two sensor arrangements, each sensor arrangement comprising first and second sensor components, the first sensor components being mounted on the pivot assembly so that the first sensor components face in two respective directions, and the tilting mechanism further includes a support arrangement for supporting the second sensor components, wherein the first sensor components define respective tilt axes, whereby pivoting motion of the pivot assembly about one of the tilt axes effects linear motion of the other first sensor component relative to the respective second sensor component to create input signals, such as input signals for a data processing apparatus.

The input signals may be for controlling a device, for example for effecting movement of an image on a display, and/or for controlling movement of a device in the real world.

The tilting mechanism may be for an input device for a data processing apparatus. The tilting mechanism may be for a computer input device.

The first sensor components may face in two mutually perpendicular directions.

The pivot assembly may comprise a first pivot means. The first pivot means of the twisting mechanism may constitute the first pivot means of the tilting mechanism.

The pivot assembly may be mounted on a movable carrier arrangement, which may constitute the movable carrier arrangement described above in connection with the panning mechanism. Desirably, the pivot assembly is provided on the elongate shaft member.

Centring means may be provided to urge the pivot assembly to a non-pivoted condition, in which each of the first sensor components is directed centrally at a respective one of the second sensor components.

The pivot assembly may comprise a second pivot means, which may receive the first pivot means. The recess may be a hemi-spherical recess. The second pivot means of the twisting mechanism may constitute the second pivot means of the tilting mechanism. The second pivot means may include a central portion and projecting members extending radially outwardly therefrom substantially perpendicularly to each other. The first sensor components may be mounted on respective free ends of the projecting members.

The support arrangement may comprise two upstanding members, upon which the second sensor components are mounted. The support arrangement may further include a support member upon which the upstanding members are mounted.

The centring means may comprise a spring, which may be a compression spring. The centring means may further include a load spreading member provided on the spring. The second pivot means may have a lower face and an annular projection extending downwardly from the lower face.

The annular projection may engage the load spreading member, and may press downwardly thereon when the pivoting assembly is tilted relative to the horizontal.

Thus, the cover member provides a return to zero arrangement for the tilting mechanism, ensuring that the first sensor components are disposed centrally of the respective second sensor components.

The centring means may further include a cover member for housing the spring. The cover member may have a radially inwardly extending flange portion. The lower face of the second pivot means may engage the cover member when the second pivot means is tilted to a desired extent. The second pivot means may engage the flange portion when so tilted. The flange portion of the cover member may constitute a stop member to prevent tilting of the tilting mechanism to a greater extent than desired.

The cover member may include projections to cooperate with fastening formations on the support arrangement to fasten the cover member to the support arrangement.

The support member of the twisting mechanism may constitute the support member of the tilting mechanism.

The tilting mechanism may be a two axis tilting mechanism and may be capable of tilting in both axes at the same time or in one axis at a time.

According to another aspect of this invention, there is provided an input device comprising one or more of a panning mechanism, a twisting mechanism and a tilting mechanism described above.

The input device may comprise no more than one of the panning mechanism, the twisting mechanism and the tilting mechanism. The input device may comprise no more than two of the panning mechanism, the twisting mechanism and the tilting mechanism. The input device may comprise the panning mechanism, the twisting mechanism and the tilting mechanism.

The input device may be an input device for a data processing apparatus. The input device may be a computer input device.

A first embodiment of the computer input device may be a 5 axis input device. A second embodiment of the computer input device may be a two axis input device.

According to a further aspect of this invention, there is provided an input device comprising a cabling arrangement for transmitting electrical signals from a first electronic component to a second electronic component, wherein the input device comprises a base member and a housing member, each of said base and housing member defining front and rear apertures, and said cabling arrangement extend through the front or rear apertures between the aforesaid electronic components.

The input device may be an input device for a data processing apparatus. The input device may be a computer input device.

Each of the housing member and the base member may define a respective central aperture between the front and rear apertures.

An elongate post member may extend through the front or rear apertures. The cabling arrangement may extend through the elongate post member. The elongate post member may have upper and lower end regions, each of which desirably defines a plurality of slots. The cabling arrangement may extend through one of the slots at each of the upper and lower end regions. The elongate post member may be the elongate post member described above.

The input device may further include one or more of a panning mechanism, a twisting mechanism and a tilting mechanism described above.

Embodiments of the invention will now be described by way of example only, with reference to the accompanying drawings, in which:

FIG. 15 is an exploded view of a pivot assembly and a main spring arrangement;

FIG. 27 is an exploded view of the input device shown in FIG. 26.

Figure 1:
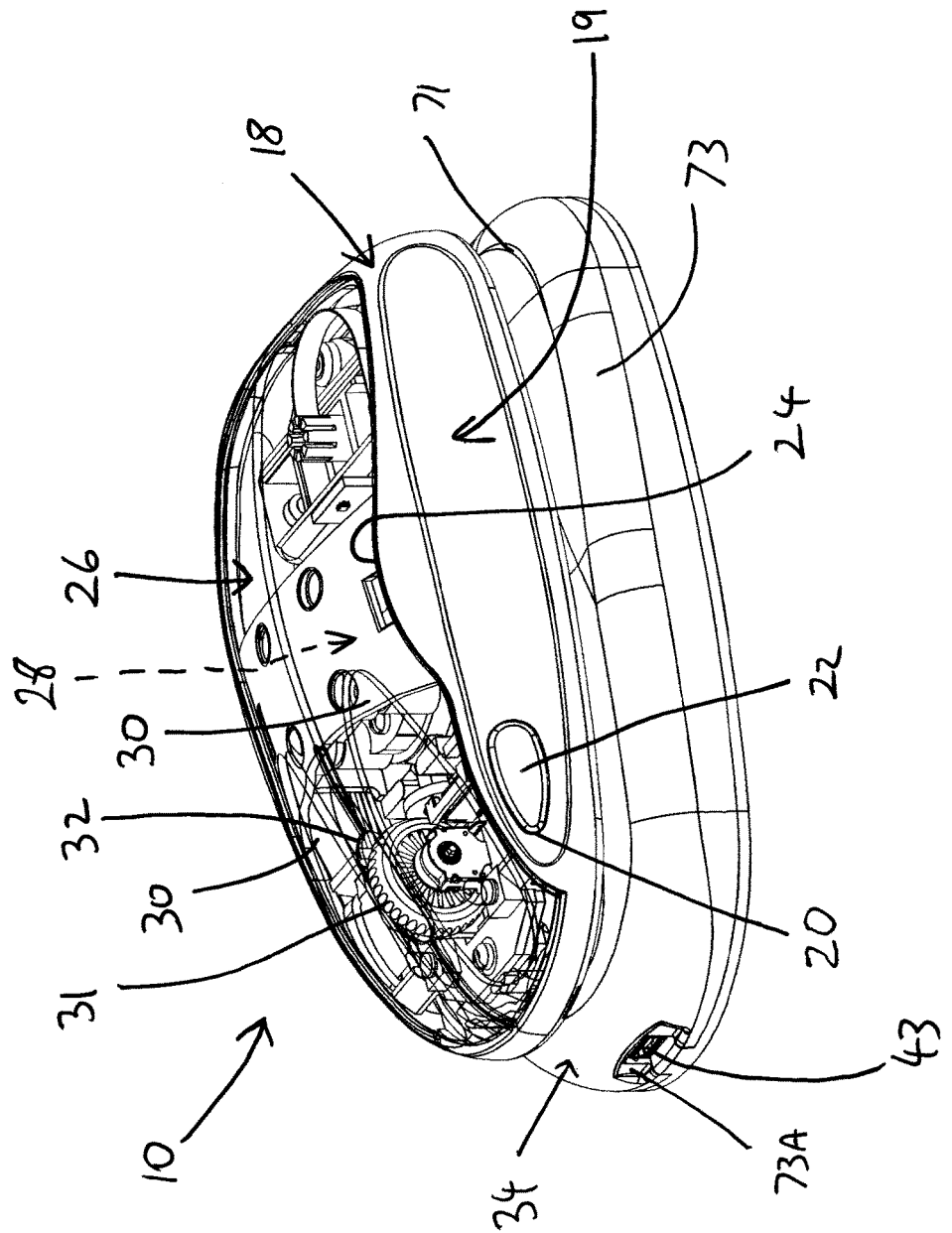
FIG. 1 is a perspective view of a first embodiment of an input device.
Figure 2:
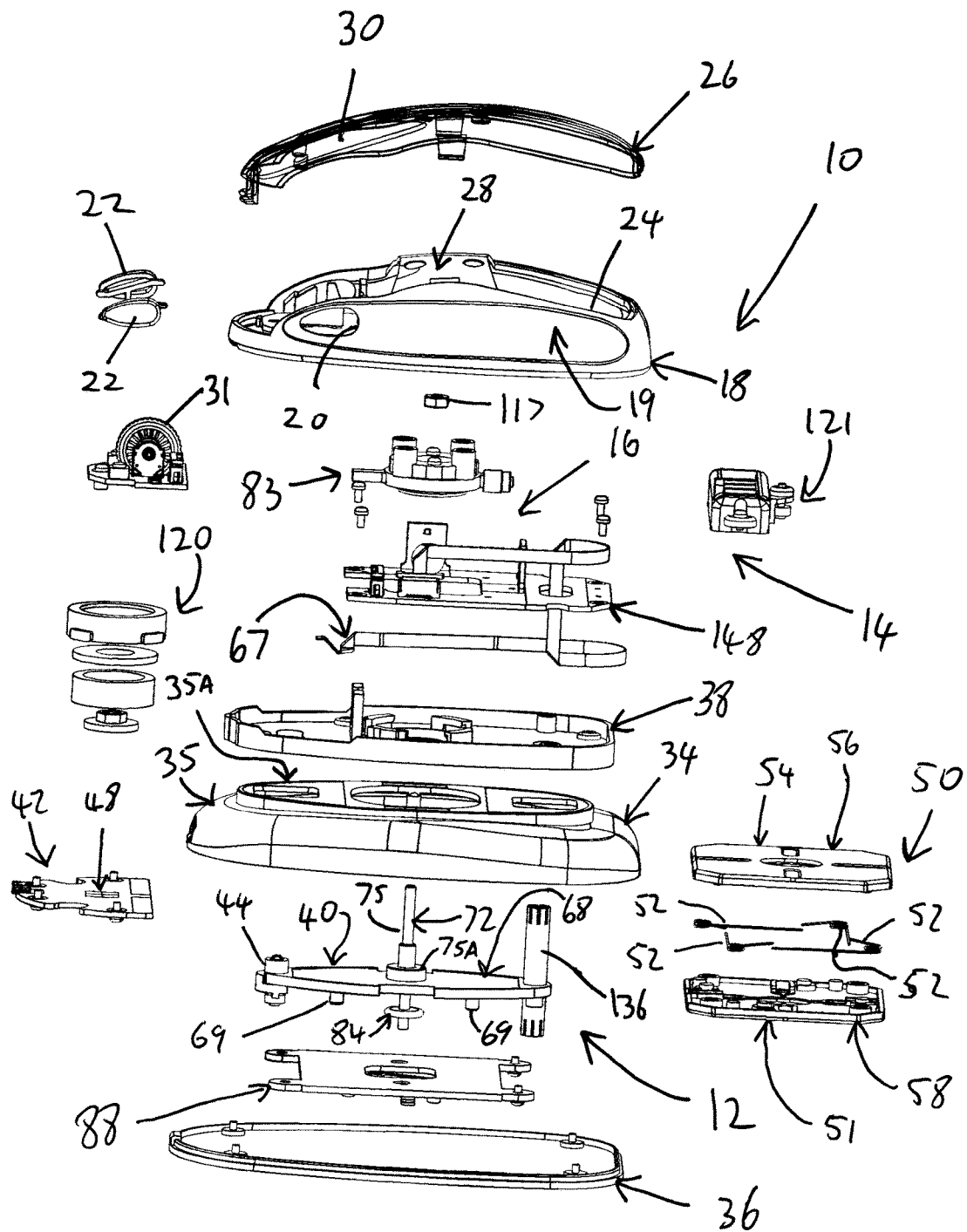
FIG. 2 is an exploded view of the input device shown in FIG. 1.
Figure 3:
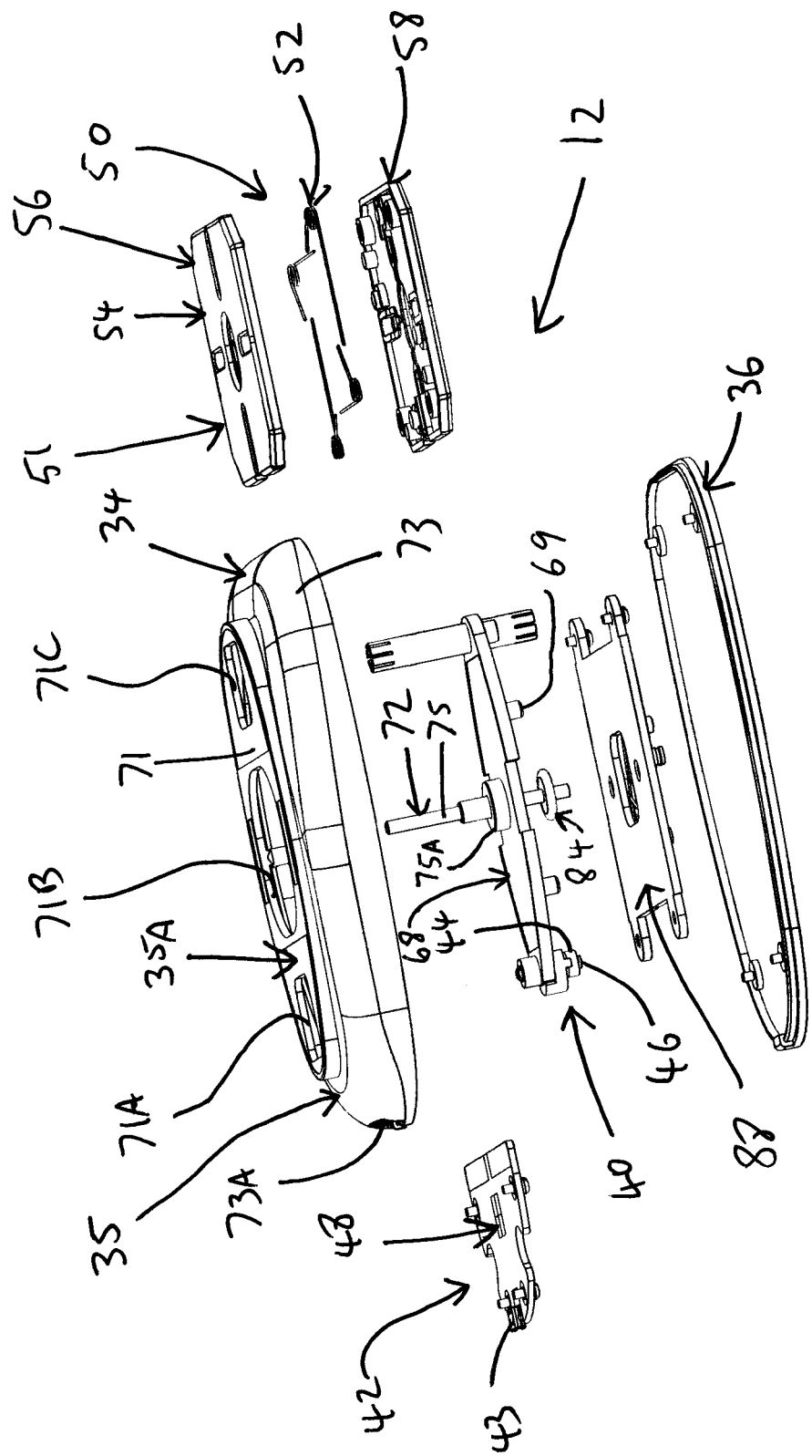
FIG. 3 is an exploded view of a panning mechanism, being part of the input device.

FIGS. 1 and 2 show a first embodiment of an input device in the form of a computer input device 10, which comprises a panning mechanism 12 (see FIGS. 3 to 11), a twisting mechanism 14 (see FIGS. 12 to 19) and a tilting mechanism 16 (see FIGS. 20 to 24). The computer input device 10 is a 5 axis input device. The computer input device 10 is suitable for controlling the movement of an image on a screen and/or for controlling movement of a physical apparatus or device in the real world.

The computer input device 10 comprises an upper housing member 18 comprising a skirt portion 19, which defines a pair of forward apertures 20 on each side of the skirt portion 19. Two side buttons 22 are received in the forward apertures 20, the side buttons 22 being connected to suitable electronic components, as would be understood by those skilled in the art. A bridging portion 28 extends between opposite sides of the skirt portion 19. Further components of the computer input device 10 can be attached to the bridging portion 28.

The upper housing member 18 defines an upper main aperture 24 in which a cover member 26 is received, the cover member 26 being attached to the upper housing member by suitable attachment means known in the art. The cover member 26 defines two upper buttons 30. The side buttons 22 and the upper buttons 30 are operable to control electronic components within the computer input device 10 in a manner that would be understood by those skilled in the art.

The computer input device 10 also includes a scroll wheel 31, a portion of which extends through a central scroll aperture 32 in the cover member 26. The scroll wheel 31 is also connected to suitable electronic components which would also be understood by those skilled in the art.

Referring to FIGS. 3 to 11, the panning mechanism 12 comprises a lower housing member 34 which is fixedly attached to a lower base plate 36. A support arrangement in the form of an upper base plate 38 is provided above the lower housing member 34 (see FIG. 2).

Figure 4:
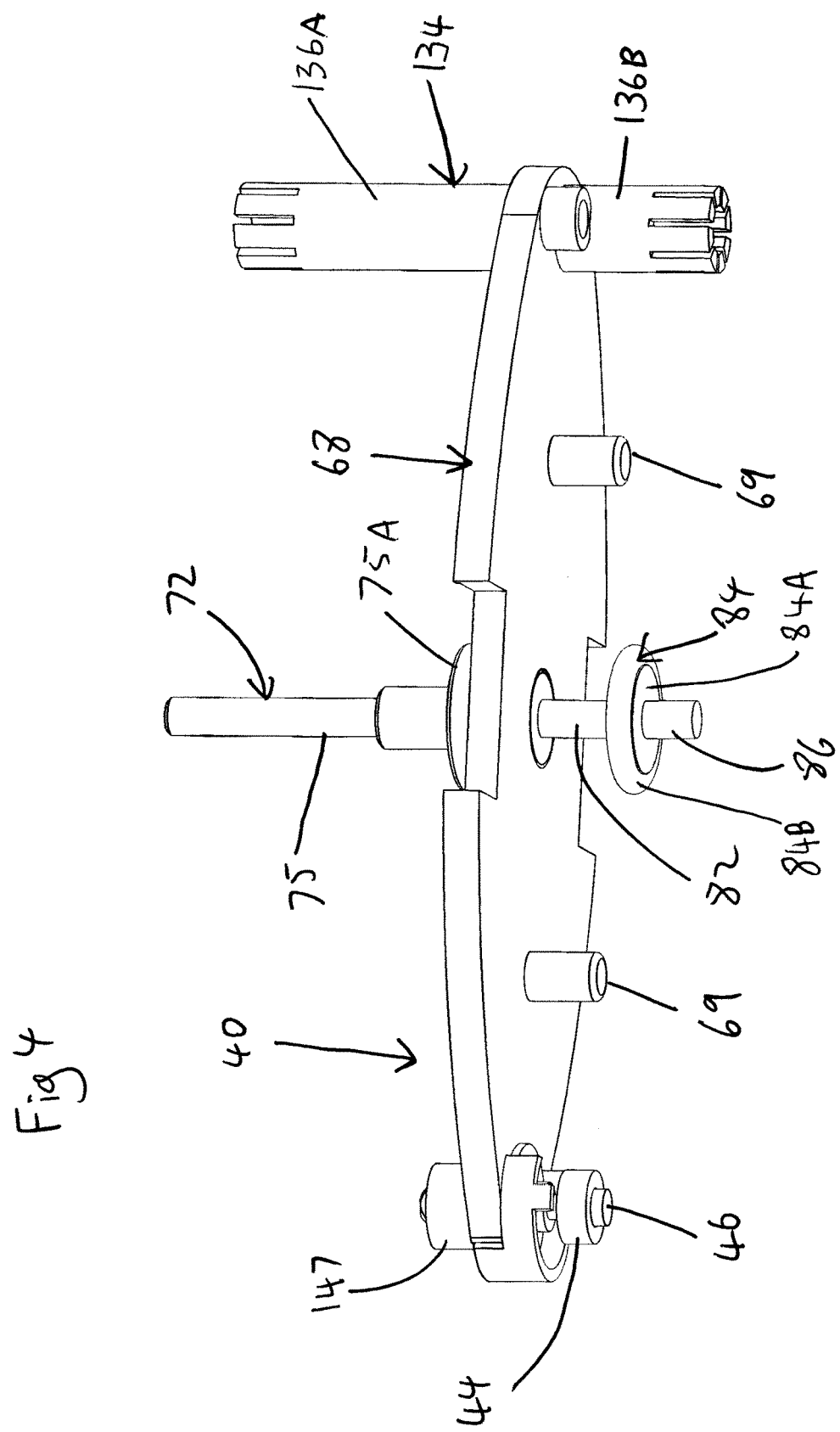
FIG. 4 shows a movable carrier arrangement, being part of the panning mechanism.

Referring to FIG. 4, the panning mechanism 12 further includes a moveable carrier arrangement 40 and a fixed carrier arrangement 42, both of which are housed within the lower housing member 34.

The panning mechanism 12 includes a sensor arrangement comprising a first sensor component in the form of a magnet 46 mounted on a lower end of a downwardly extending post 44 extending downwardly from the movable carrier arrangement 40, at a front region thereof. The sensor arrangement further includes a second sensor component, in the form of four Hall Effect chips 48 arranged in a square array on the fixed carrier arrangement 42. The fixed carrier arrangement 42 is fixedly attached to either the lower base plate 36 or the lower housing member 34. A socket 43 is provided at the front end of the fixed carrier arrangement 42, into which a plug, such as a USB, or other suitable, plug (not shown) can be inserted, to allow signals from the computer input device 10 to be transmitted to a computer via a cable attached to the plug.

Figure 5:
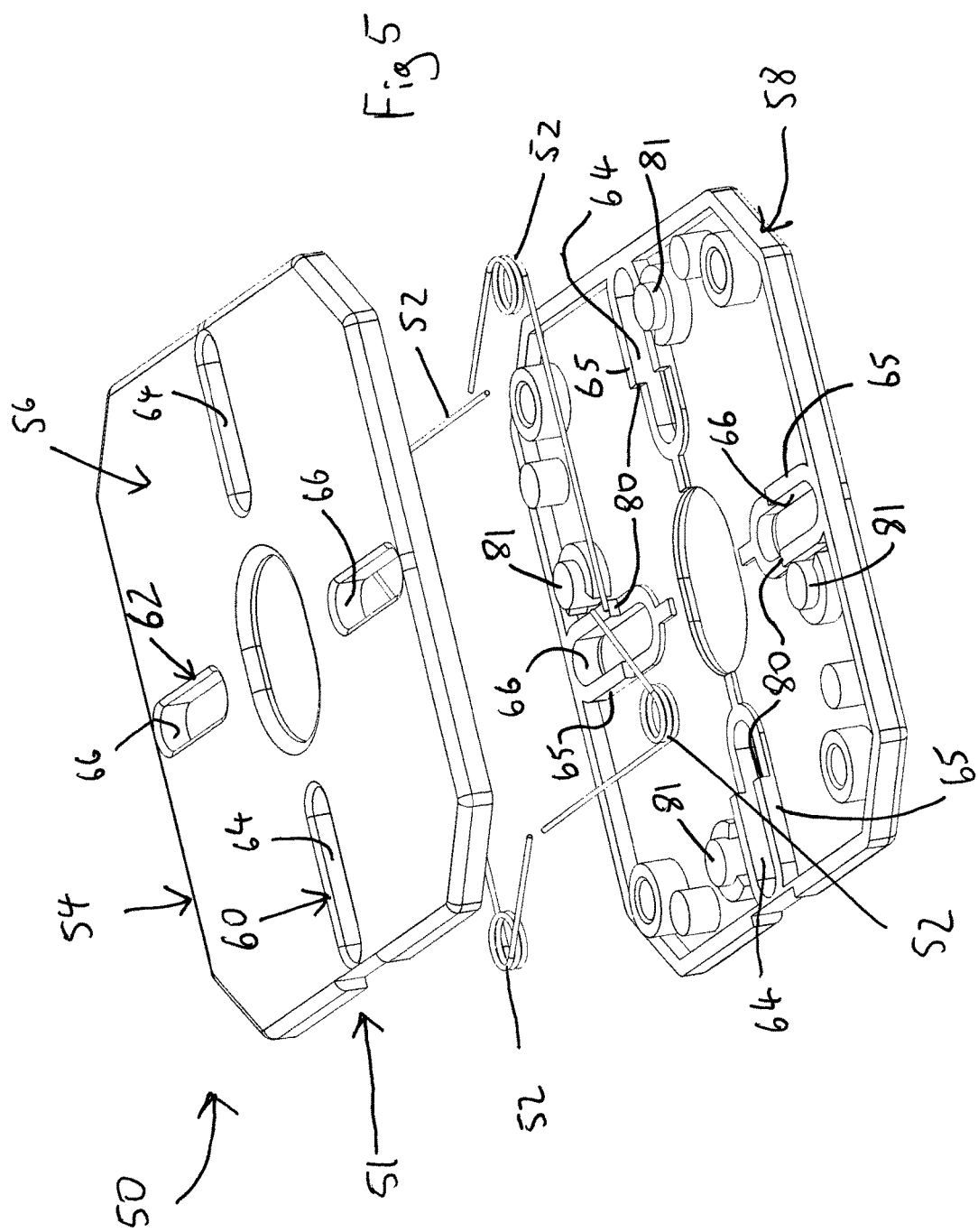
FIG. 5 is an exploded view of a constraining means, being part of the panning mechanism.
Figure 6:
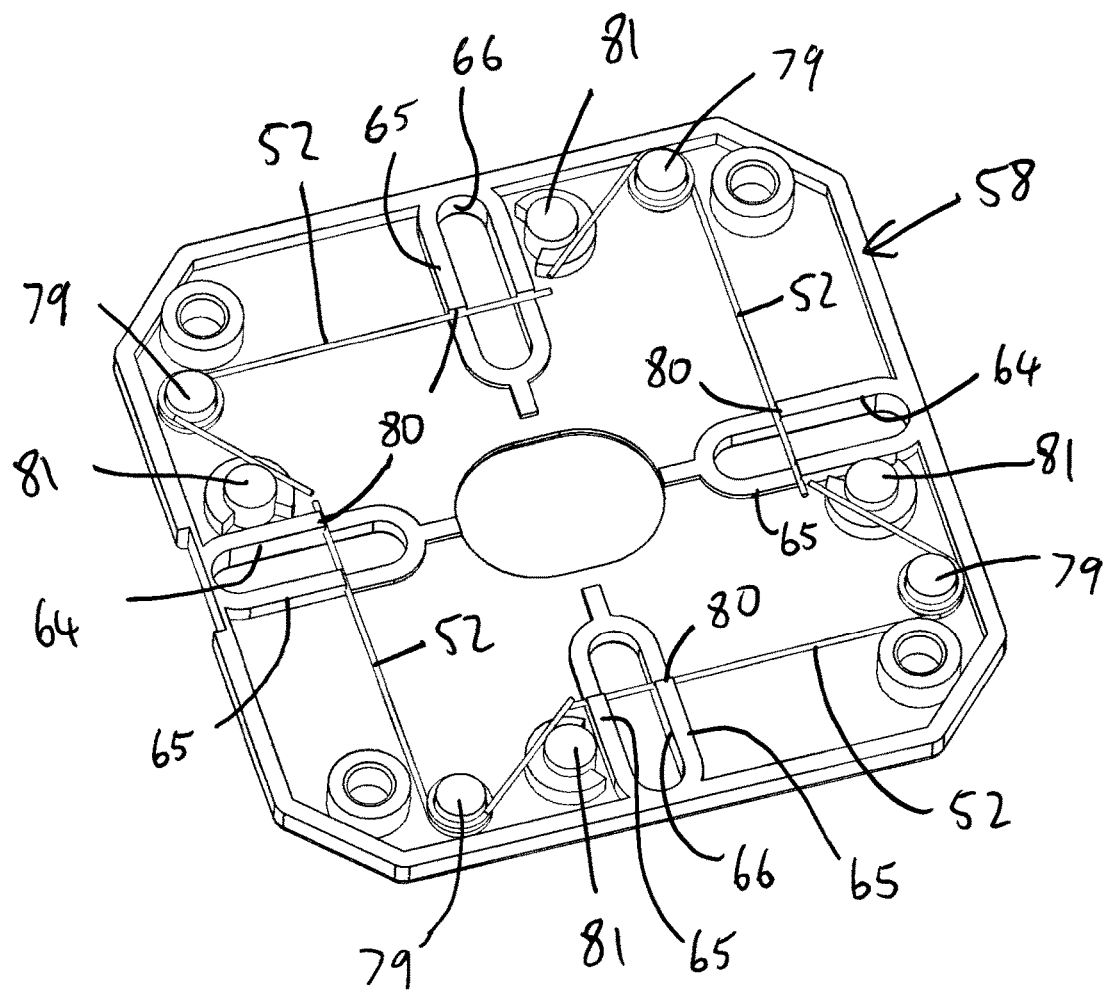
FIG. 6 is a top view of the constraining means with an upper casing member removed.

Referring to FIGS. 5 and 6, the panning mechanism 12 further includes constraining means 50 comprising a guide arrangement 51 and a plurality of urging members 52 held within the guide arrangement 51. In the embodiment shown, the guide arrangement 51 is in the form of a cartridge.

The guide arrangement 51 comprises a casing 54 in which the urging members 52 are held. The casing 54 comprises upper and lower casing members 56, 58. The urging members 52 are in the form of springs. In the embodiment shown, the guide arrangement 51 comprises four urging members 52.

The casing 54 includes first and second mutually perpendicular guide ways 60, 62 for guiding movement of the movable carrier arrangement 40. The first guide way 60 is in the form of two collinear first guide slots 64 defined in each of the upper and lower casing members 56, 58. The collinear first guide slots 64 defined in the upper casing member 56 are aligned with the collinear first guide slots 64 defined in the lower casing member 58.

The second guide way 62 is in the form of two collinear second guide slots 66 defined in each of the upper and lower casing members 56, 58. The collinear second guide slots 66 defined in the upper casing member 56 are aligned with the collinear second guide slots 66 defined in the lower casing member 58. The first guide way 60 and the collinear first guide slots 64 extend perpendicularly to the second guide way 62 and the collinear second guide slots 66. Wall members 65 extend around the edges of first and second guide slots 64, 66.

Referring back to FIG. 4, the movable carrier arrangement 40 comprises a carrier member 68 and a pair of downwardly extending first guide members in the form of first guide pegs 69 on the lower face of the carrier member 68. The carrier member 68 is in the form of a substantially flat plate. The guide pegs 69 are received through the collinear first guide slots 64.

Figure 7:
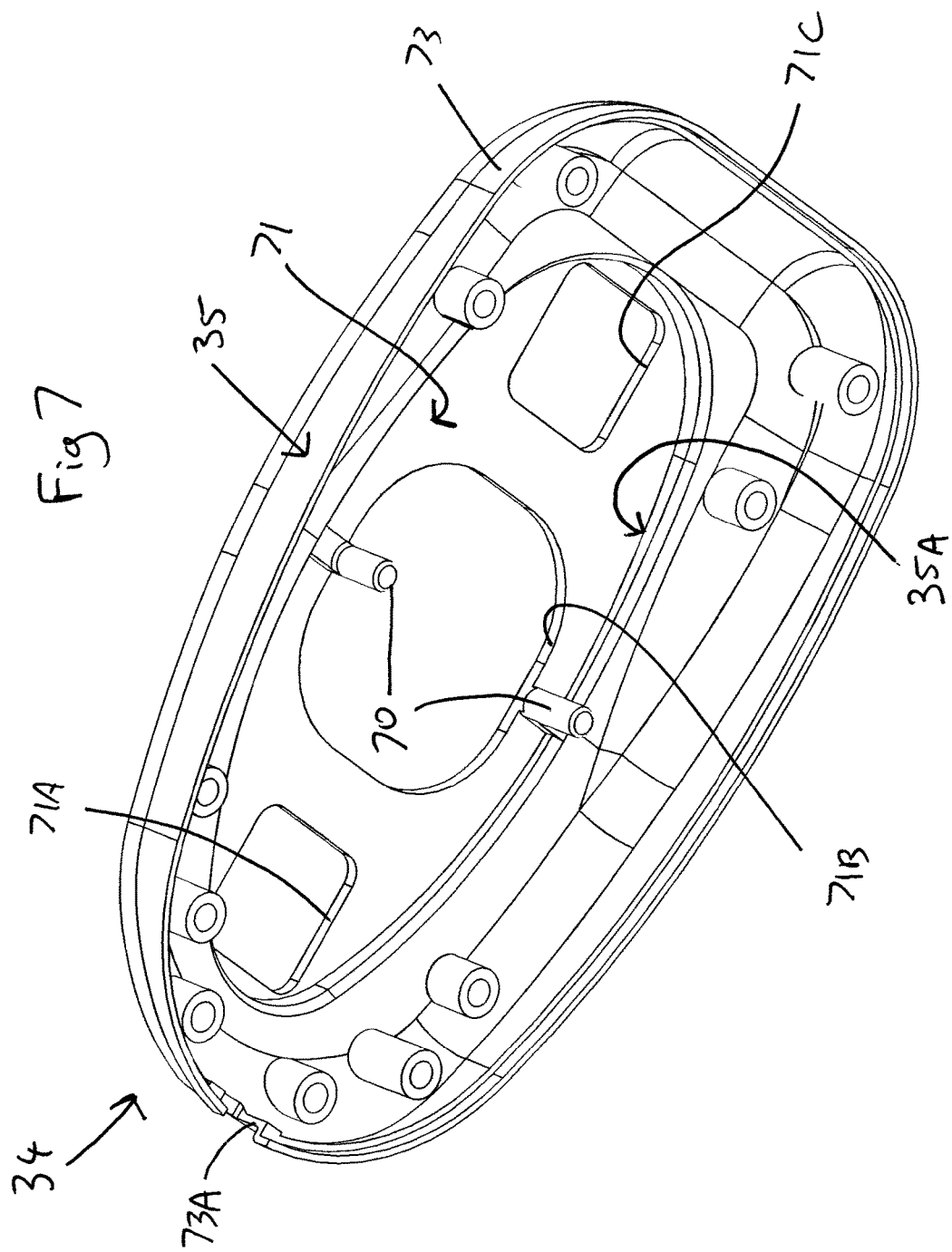
FIG. 7 is a bottom perspective view of a lower housing member.

As shown in FIG. 7, the lower housing member 34 includes a main housing portion 35 and a raised portion 35A thereon. The lower housing member 34 further includes a pair of second guide members in the form of second guide pegs 70, which are received through the collinear second guide slots 66. The main housing portion 35 comprises an upper cover 71 and a skirt 73 extending downwardly from the upper cover 71. In an alternative embodiment, the second guide pegs 70 can be provided on the lower base plate 36.

Figure 25:
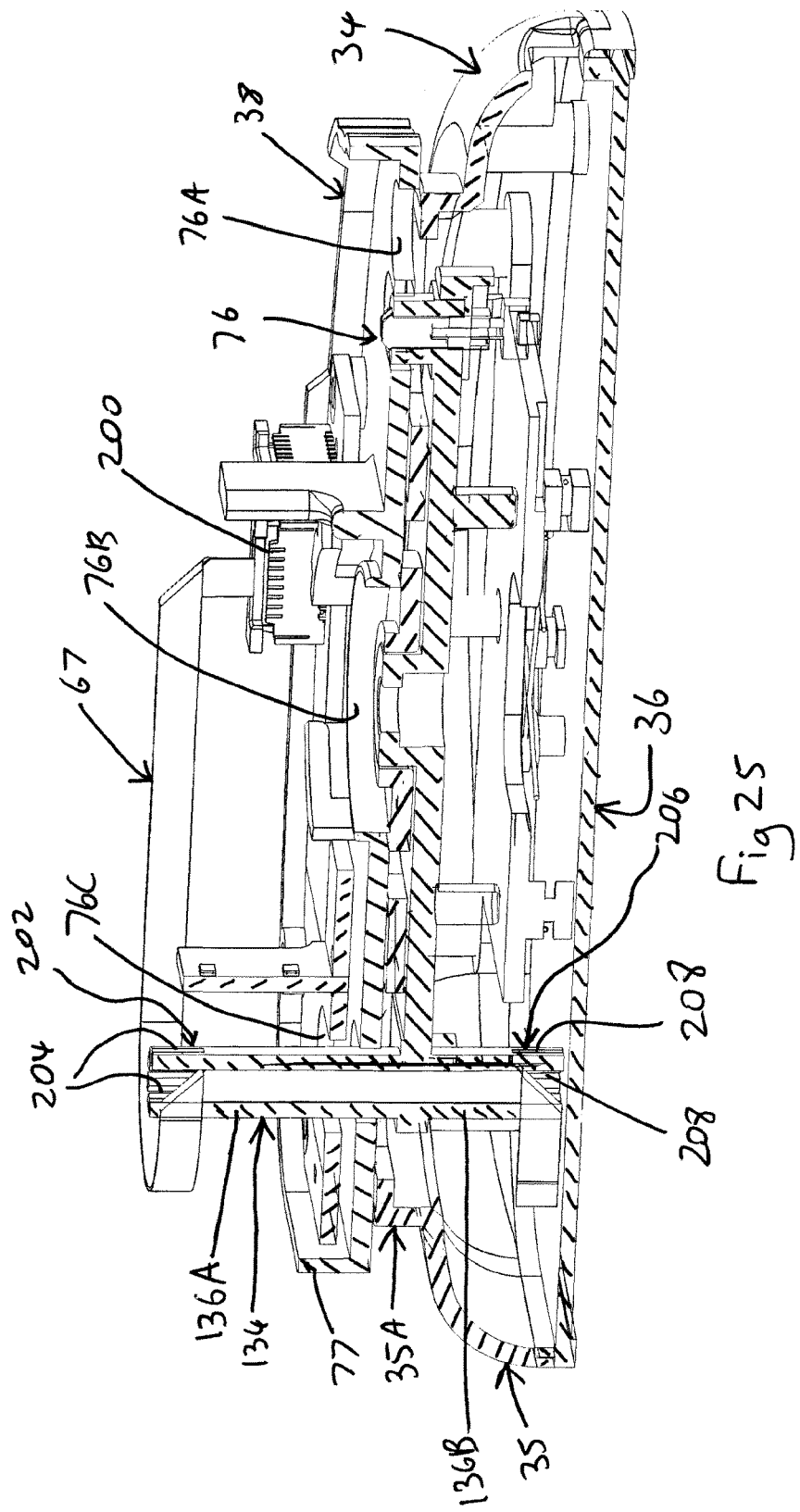
FIG. 25 is a sectional view of part of the input device showing a cabling arrangement.

The upper cover 71 defines a forward aperture 71A, a central aperture 71B and a rearward aperture 71C. The rearward aperture 71C allows an electronic cabling arrangement, in the form of a PCB ribbon cable 67 to extend therethrough between the electronic components of the computer input device 10. This is shown in FIG. 25 and described in more detail below.

The central aperture 71B and the rearward aperture 71C allow components of the panning mechanism 12 to extend to the twisting and the tilting mechanisms 14, 16. It will be appreciated that the electronic cabling could extend through forward or rearward apertures 71A, 71C.

The forward end region of the skirt 73 defines an opening 73A to allow a USB, or other suitable plug, to be inserted into the socket. It will be appreciated that the opening 73A could be omitted for embodiments that operate wirelessly, or which are hard wired.

Figure 8:
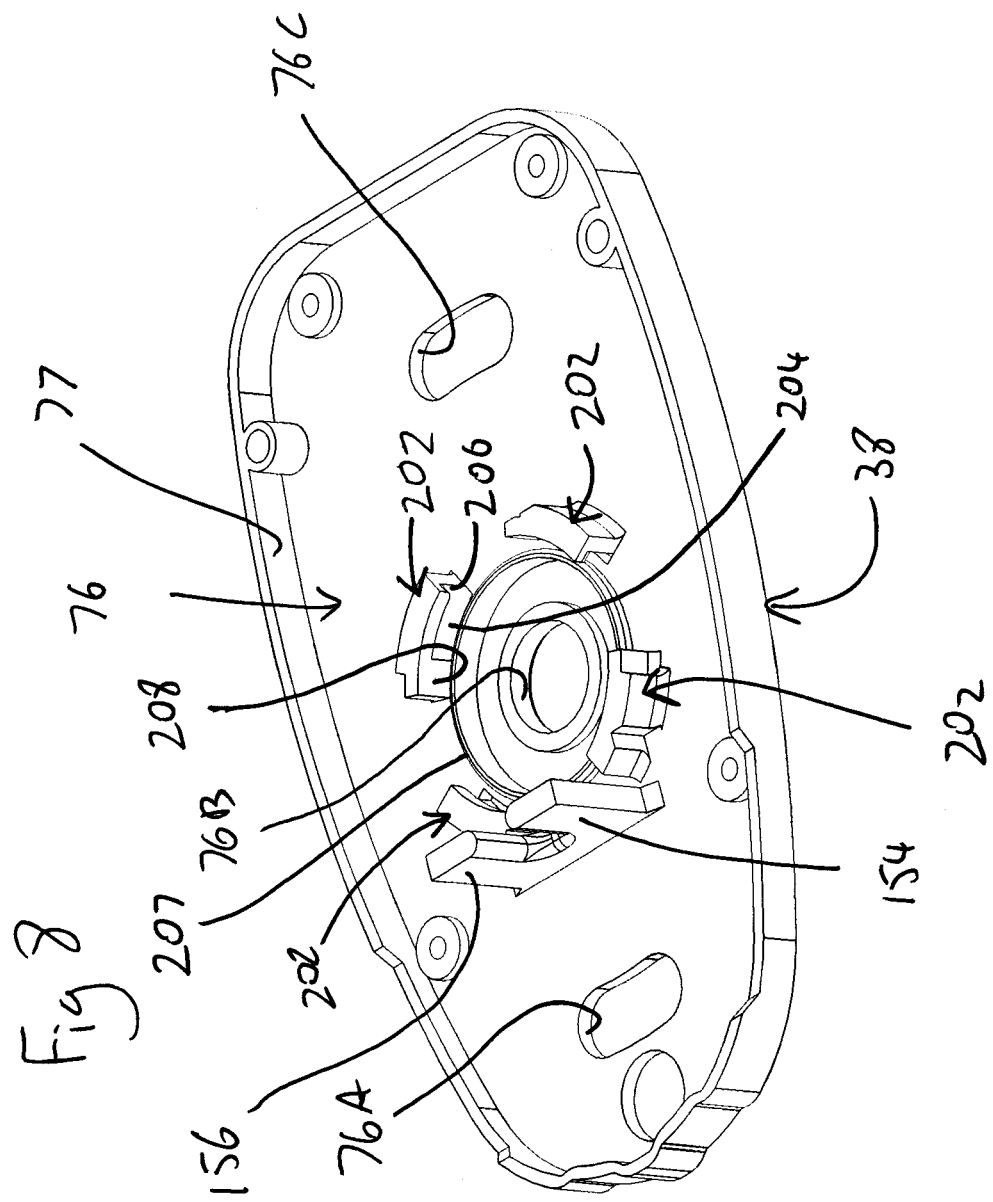
FIG. 8 is a top perspective view of an upper base plate.

FIG. 8 shows the upper base plate 38, which comprises a substantially planar base portion 76, defining a forward aperture 76A, a circular main aperture 76B and a rearward aperture 76C. The forward, main and rearward apertures 76A, 76B and 76C defined in the upper base plate 38 are aligned with the forward, central and rearward apertures 71A, 71B and 71C respectively of the lower housing member 34. A wall 77 extends around the base portion 76.

The movable carrier arrangement 40 further includes an elongate shaft member 72 which is attached to, and extends from the movable carrier member 68. The elongate shaft member 72 has an upwardly extending portion 75, which extends through the central aperture 71B defined in the upper cover 71 of the lower housing member 34, and through the aligned aperture 76B defined in the upper base plate 38.

The forward aperture 76A and the rearward aperture 76C are in the form of curved slots, being arcs of circles. The centres of said circles are coincident with the elongate shaft member 72 extending through the main aperture 76B. The centres of the circles are also coincident with the centre of the central aperture 76B.

A substantially radially extending projecting means 75A is provided on the upwardly extending portion 75. The radially extending projecting means 75A is in the form of a disc and is provided within the central aperture 71B of the upper cover 71. In one embodiment, the radially extending projecting means 75A can engage the edge of the aperture 71B. Thus, the edge of the aperture 71B can act as a limiting formation to limit the extent of movement of the movable carrier arrangement 40. If desired a sound reducing member, such as a rubber O ring can be mounted on the radially extending projecting means 75A.

The upwardly extending elongate shaft member 72 is secured to the bridging portion 28 of the upper housing member 18 by means of a pivot assembly 83, which is described below in connection with the twisting and tilting mechanisms 14, 16. The movable carrier arrangement 40 is secured to the upper base plate 38 by means explained below.

The movable carrier arrangement 40 is moveable in two mutually perpendicular directions, i.e. forwards and backwards, and side to side relative to the lower housing member 34 and the lower base plate 36 by corresponding movement of the upper housing member 18 and the upper base plate 38. It will be appreciated that movement in the two mutually perpendicular directions also allows diagonal movement.

The movable carrier arrangement 40 is constrained to move in the aforesaid two mutually perpendicular directions and diagonally by the first and second guide slots 64, 66.

Figure 9:
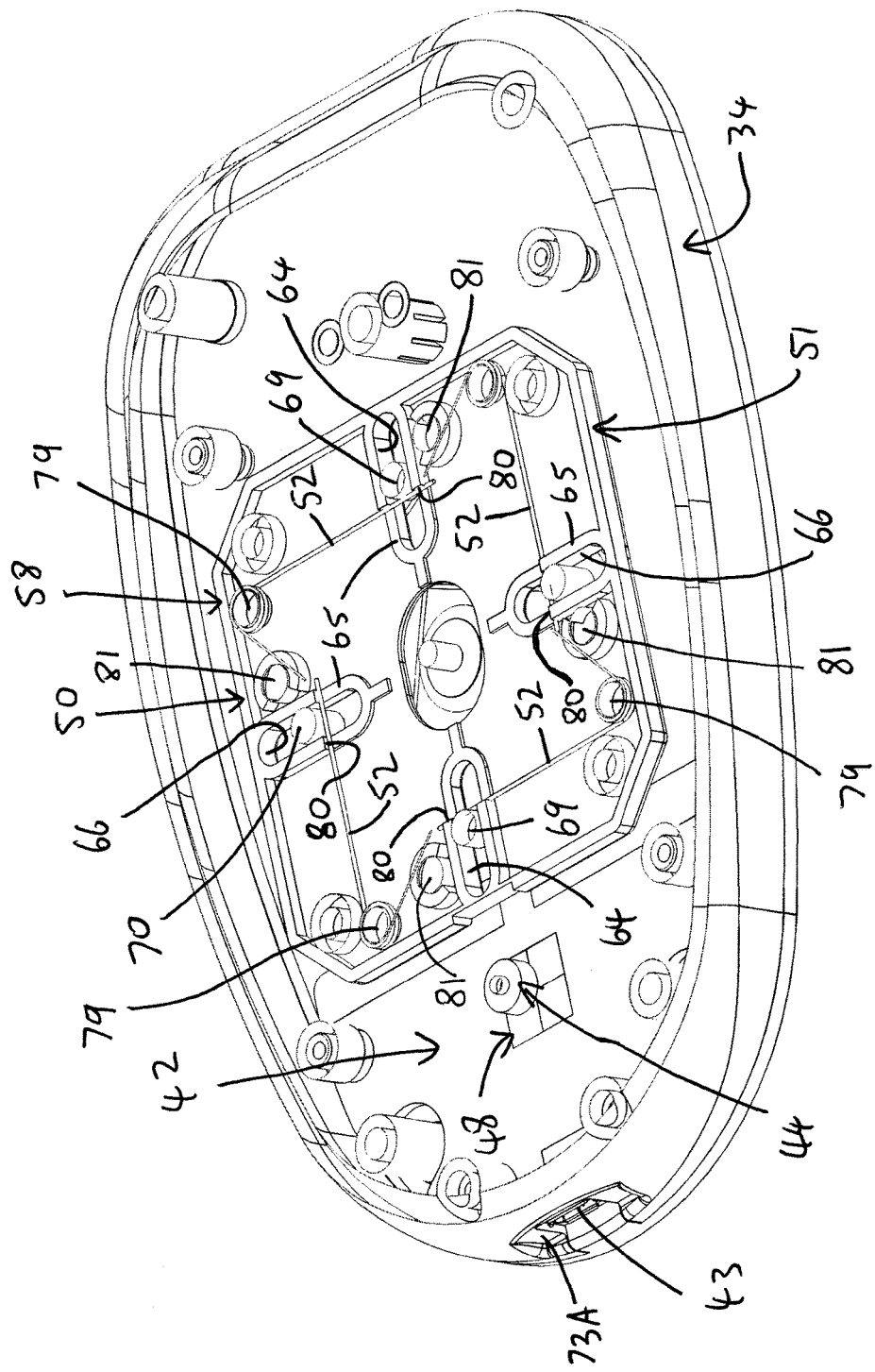
FIG. 9 is a view through the lower housing member and the upper casing member of a lower region of the input device.
Figure 10:
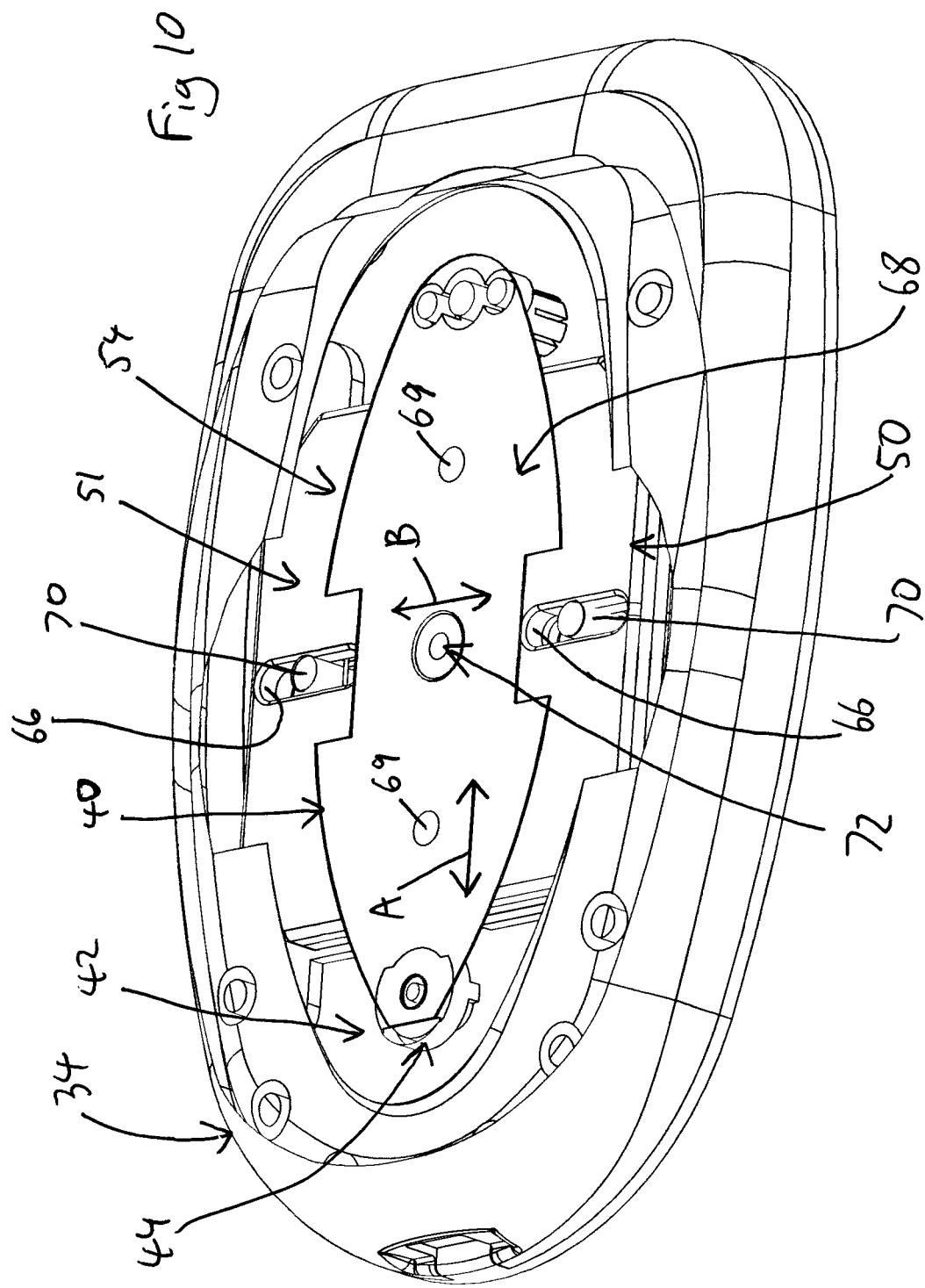
FIG. 10 is a view through the lower housing member of a lower region of the input device, including the movable carrier arrangement.

FIG. 9 is a view of the lower casing member 58 through the lower housing member 34. FIG. 10 is a view of the movable carrier arrangement 40 through the lower housing member 34.

As shown in FIG. 9, the first guide pegs 69 of the movable carrier arrangement 40 are received in the first guide slots 64, and allow the movable carrier arrangement 40 to move relative to the constraining means 50 in the forwards and backwards directions indicated by the double headed arrow A in FIG. 10.

The second guide pegs 70 of the lower housing member 34 are, as discussed above, received in the second guide slots 66, thereby allowing the movable carrier arrangement 40 and the constraining means 50 can move together in the side to side direction indicated by the double headed arrow B in FIG. 10 relative to the lower housing member 34. Thus, the interaction between the first and second guide pegs 69, 70 and the first and second guide slots 64, 66 allows the movable carrier arrangement 40 to move in the two mutually perpendicular directions indicated by the double headed arrows A and B.

The effect of this movement is that the magnet 46 moves in the aforementioned perpendicular directions across the array of Hall Effect chips 48 on the fixed carrier arrangement, which causes signals to be transmitted from the Hall Effect chips 48 via a computer processing arrangement (not shown) to move an image on a display in corresponding mutually perpendicular directions.

In order to ensure that the magnet 46 is centrally located with respect to the four Hall Effect chips 48, each of the four urging members 52 within the cartridge 54 is engaged between respective first and second reaction members in the lower casing member 58. The first reaction members are in the form of shoulders 80 on the walls 65 at the edges of the first and second guide slots 64, 66 on the lower casing member 58. The second reaction members are in the form of upstanding cylindrical posts 81 on the lower casing member 58. The urging members 52 are wrapped around support posts 79

The first and second guide pegs 69, 70 engage the end regions of the urging members 52, which urge the guide pegs 69, 70 and, thereby, the movable carrier arrangement 40 and the upper housing member 18 to a central position.

In the embodiment shown, the elongate shaft member 72 further includes a downwardly extending elongate portion 82 (see FIG. 4) upon which a second radially extending projecting means 84 is mounted. The second radially extending projecting means 84 comprises a disc member 84A and an annular sound deadening member 84B on the disc member 84A. In the embodiment shown, the sound deadening member may be a rubber O ring.

The urging members 52, the shoulders 65 and the guide pegs 69, 70 constitute a return to zero arrangement for the panning mechanism 12.

Figure 11:
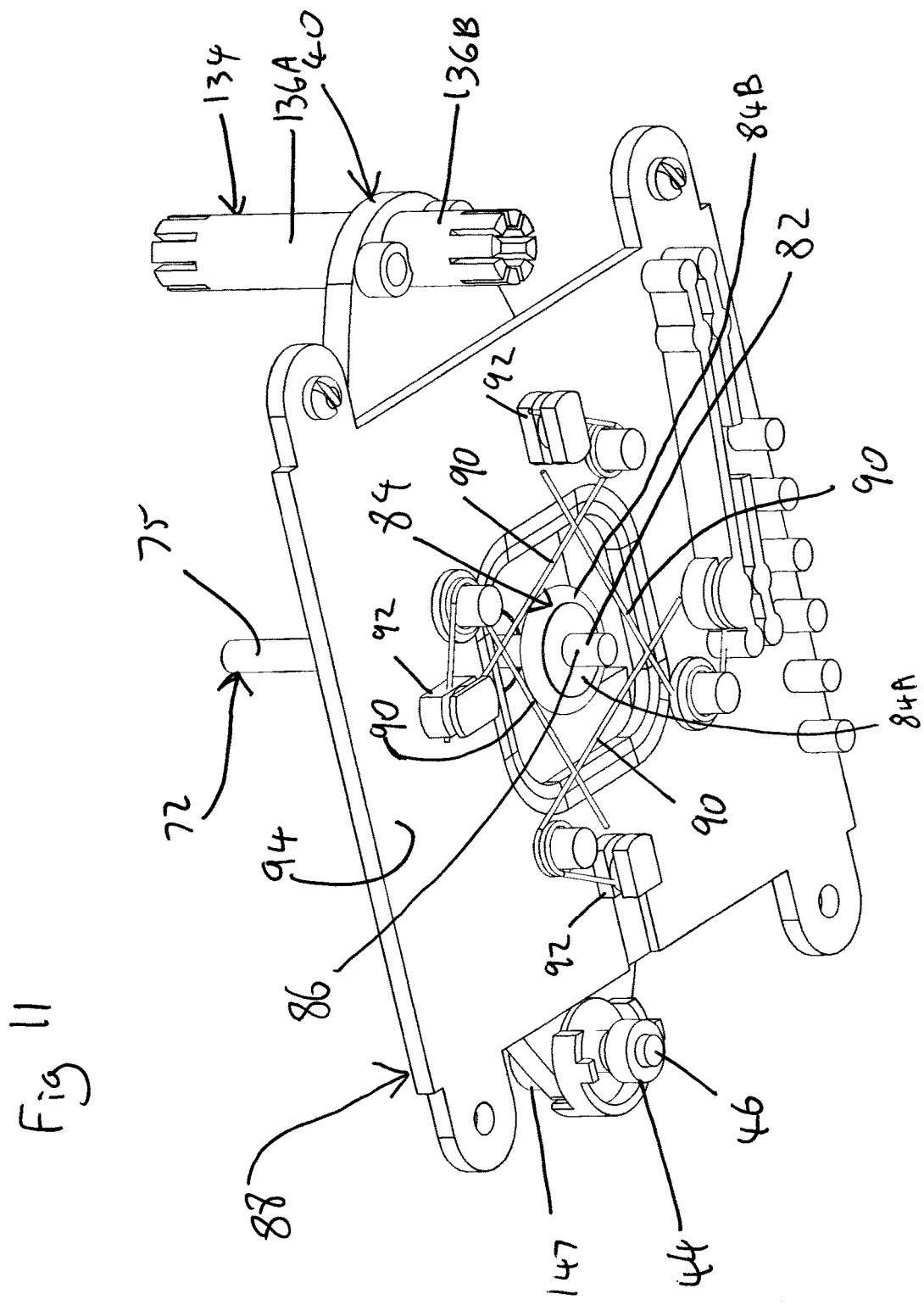
FIG. 11 is a view from below of an intermediate member and the movable carrier arrangement.
Figure 12:
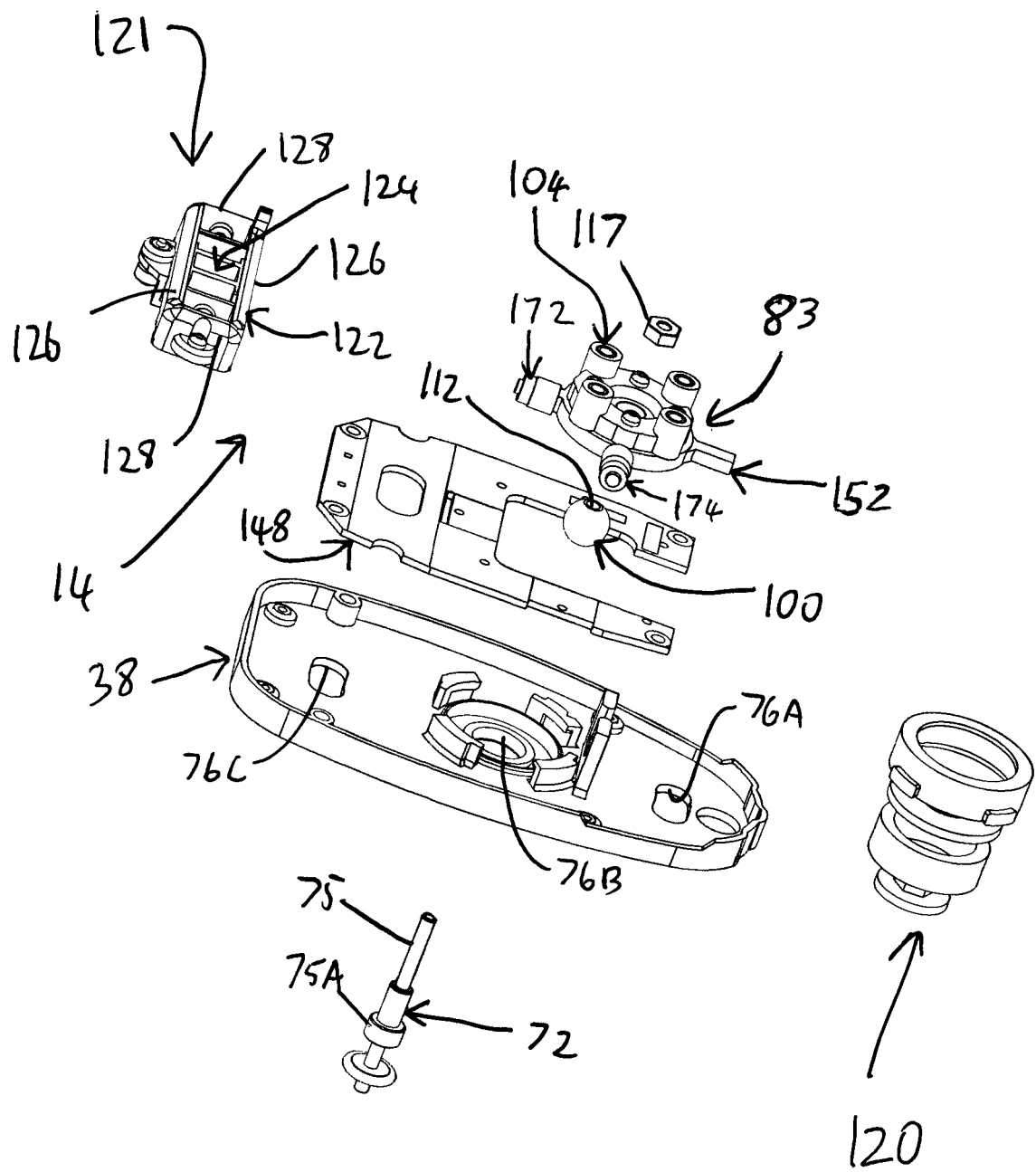
FIG. 12 is an exploded view of a twisting mechanism, being part of the input device.

As shown in FIG. 11, a lower portion 86 of the downwardly extending elongate portion 82 extends below the disc member 84. In this embodiment, a substantially flat intermediate member 88 is provided beneath the constraining means 50. The intermediate member 88 is fixedly attached to the upper housing member 18. A further four springs 90 are arranged beneath the intermediate member 88, and each of the further springs 90 engages the aforesaid lower portion 86 and a respective reaction member 92 on the lower face 94 of the intermediate member 88. Thus, the further springs 90 provide a further return force to the central position for the movable carrier arrangement 40.

The twisting mechanism 14 is shown in FIGS. 12 to 19, and comprises the pivot assembly 83, which is attached to the upwardly extending portion 75 of the elongate portion 75 on the movable carrier arrangement 40. The pivot assembly 83 comprises a first pivot means 100 in the form of a spherical member mounted on the upwardly extending elongate shaft member 72. The pivot assembly 83 comprises a second pivot means 102 for holding the first pivot means 100.

Figure 13:
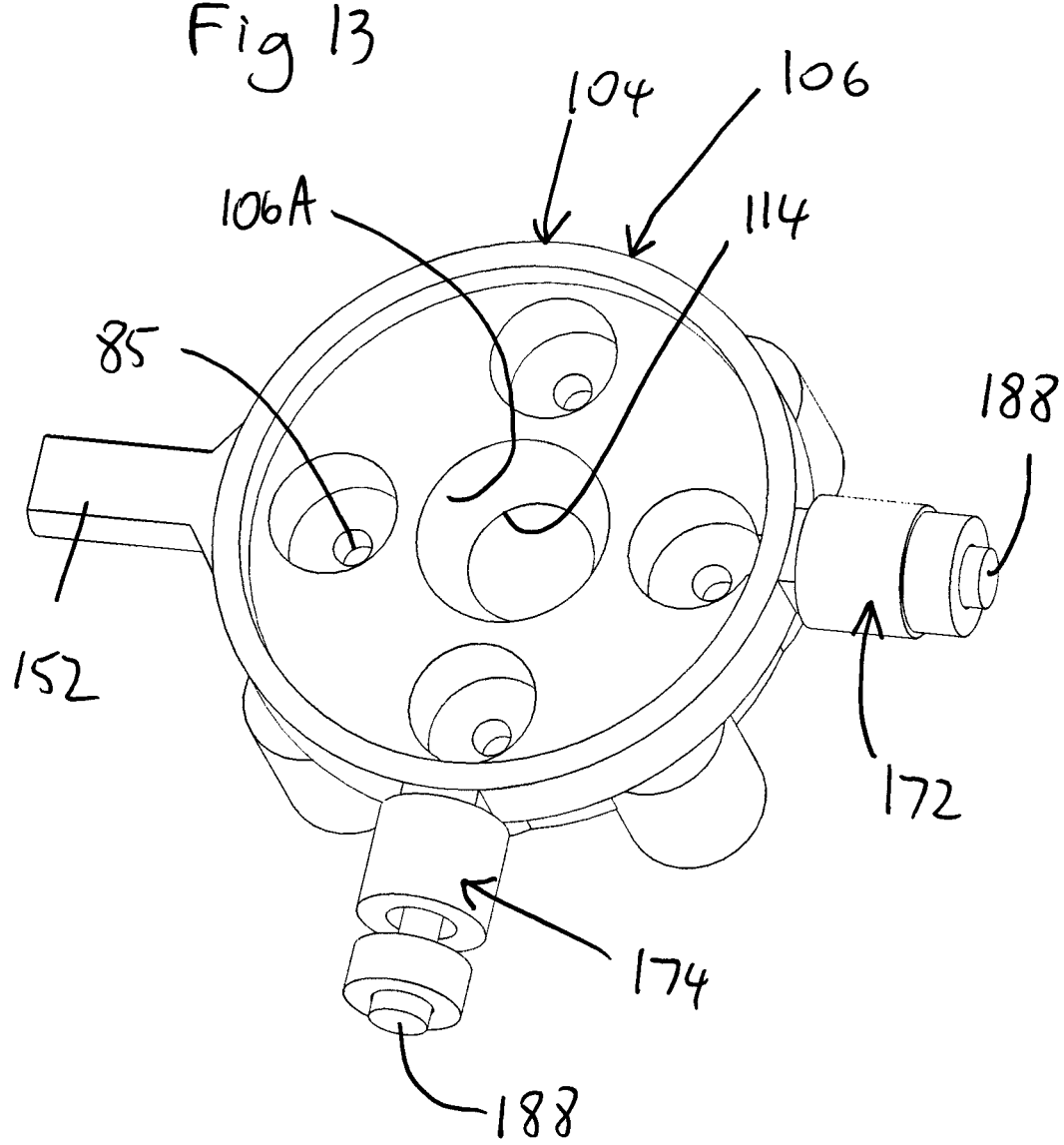
FIG. 13 is a view from below of an upper pivot member.
Figure 14:
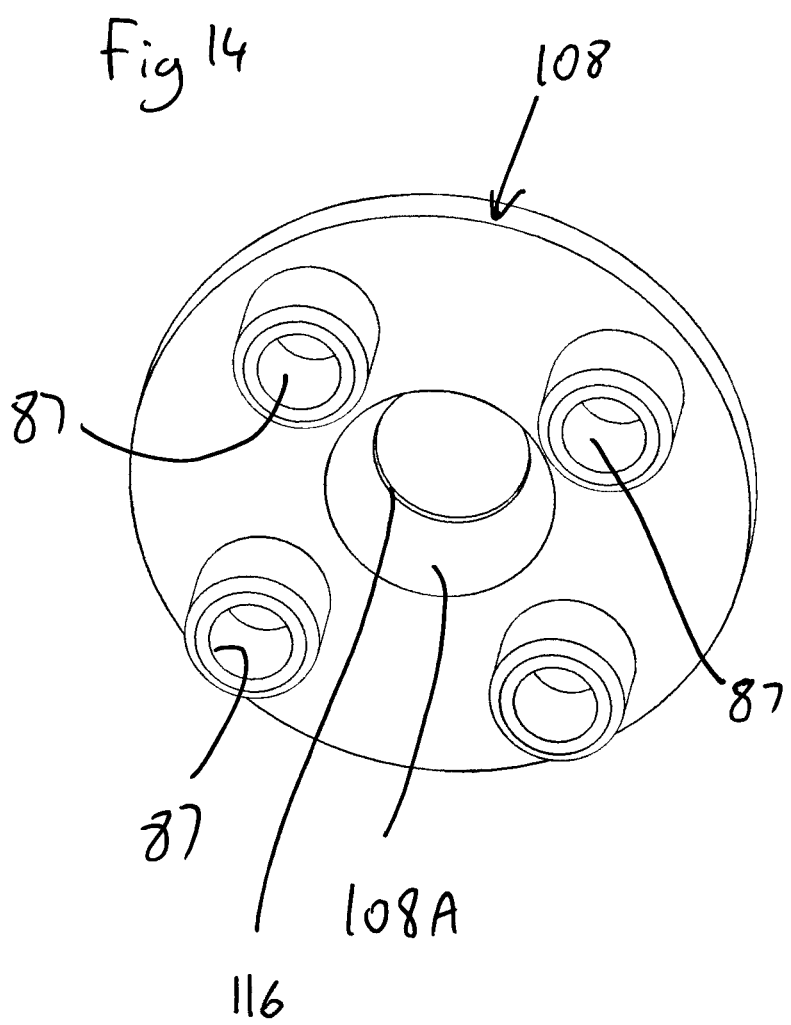
FIG. 14 is a view from above of a lower pivot member.

The second pivot means 102 comprises an upper pivot member 104 having a main part 106 defining an upper recess 106A (see FIG. 13), and a lower pivot member 108 defining a lower recess 108A (see FIG. 14). The upper and lower pivot members 104, 108 can be secured to each other by means of bolts (not shown) inserted through aligned apertures 85, 87 in the upper and lower pivot members 104, 108. When so secured, the upper and lower recesses 106A, 108A face each other and are aligned to provide a substantially spherical space in which the first pivot means 100 is held.

Referring to FIG. 15, the first pivot means 100 defines a through bore 112 through which the upwardly extending elongate portion 75 of the elongate shaft member 72 can extend to mount the first pivot means on the elongate shaft member 72. Each of the upper and lower pivot members 104, 108 defines a respective aperture 114, 116, which are aligned with each other, so that the upwardly extending elongate portion 75 can extend therethrough when the first pivot means 100 is held by the second pivot means 102.

An upper region of the upwardly extending portion 75 is threaded so that a nut 117 can be screwed thereon to secure the second pivot means 102 to the upwardly extending elongate shaft member 72, in a manner to allow movement of the second pivot means 102 about the first pivot means 100.

The pivot assembly 83 further includes a main spring arrangement 120 to allow tilting movement of the pivot assembly 80. This is described below in more detail, in connection with the tilting mechanism 16.

The twisting mechanism 14 further includes a slide arrangement 121 mounted on the upper base plate 38. The slide arrangement 121 comprises a guide means 122 and a sensor holding arrangement 124 guided by the guide means 122.

Figure 16:
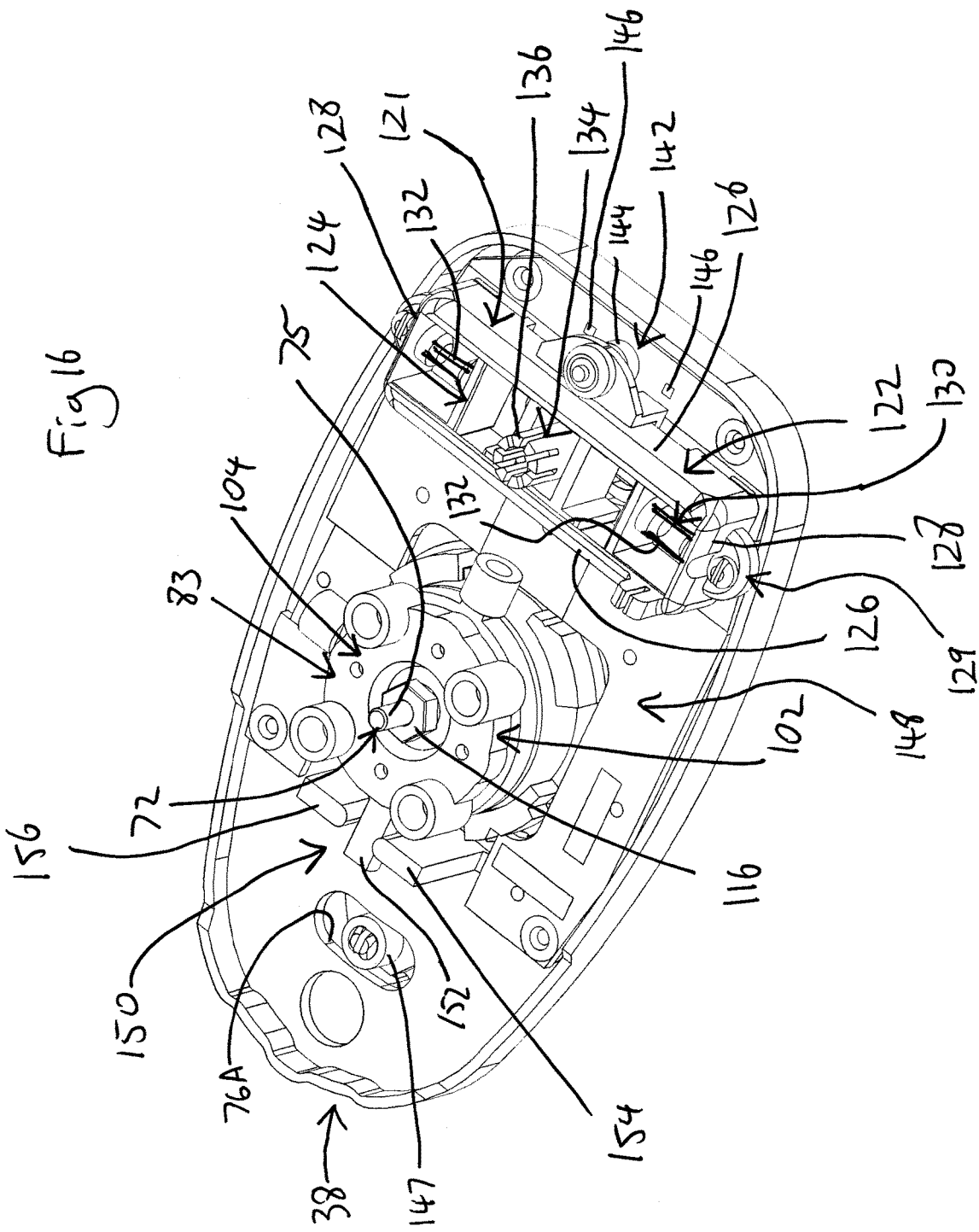
FIG. 16 is a top perspective view of the twisting mechanism.
Figure 18:
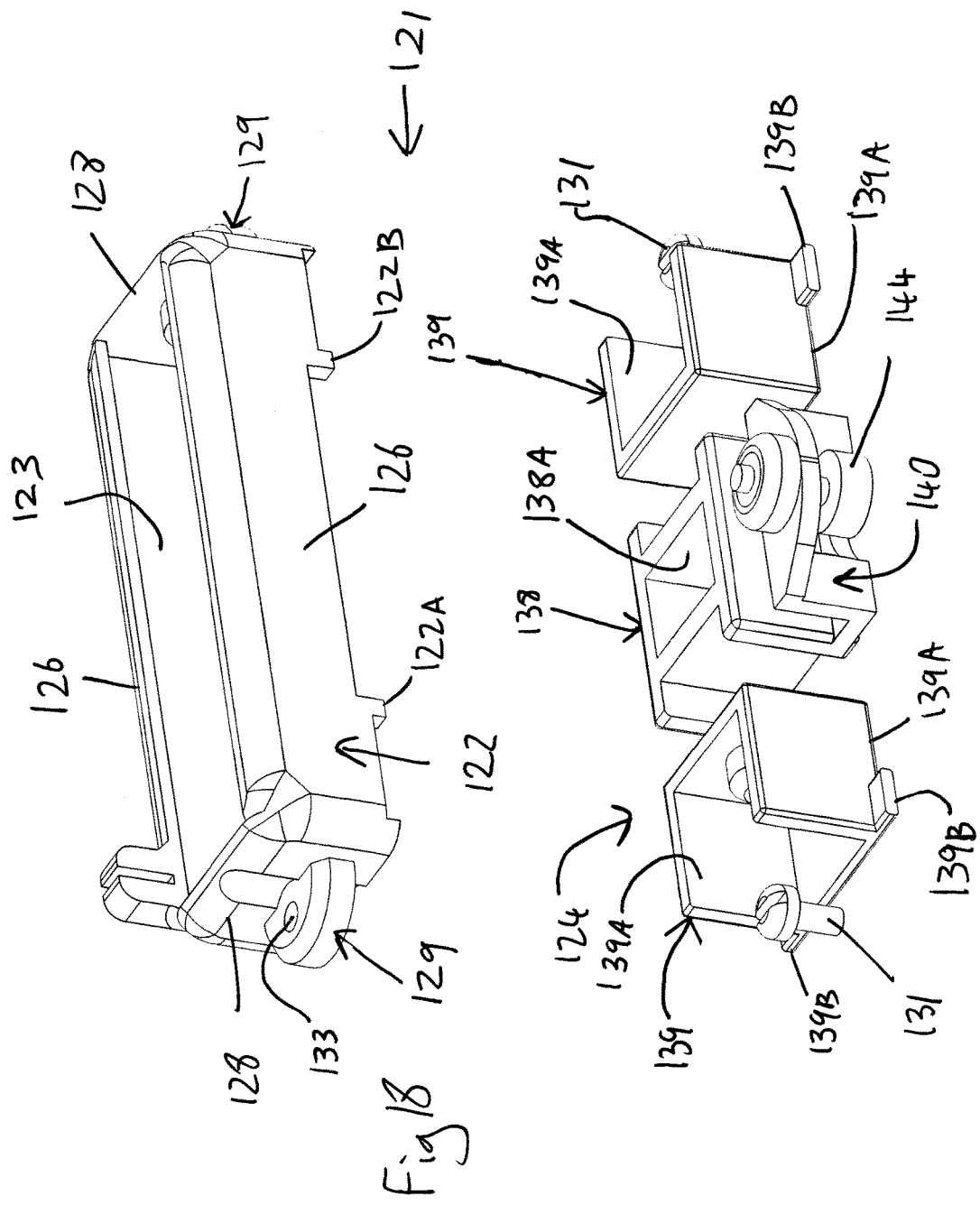
FIG. 18 is an exploded view of a slide arrangement.

Referring to FIGS. 16 and 18, the guide means 122 comprises a pair of opposite wall members 126, between which the sensor holding arrangement 124 is disposed. In operation, the sensor holding arrangement 124 and the guide means 122 can slide relative to each other so that the sensor holding arrangement 124 slides lengthwise along the opposite wall members 126.

The guide means 122 further include a pair of end members 128 at the respective opposite ends of the wall members 126. Securing formations 129 on each of the end members secure the guide means 122 to the upper base plate 38 by means of screws 131 extending through apertures 133 defined in the securing formations 129. The guide means 122 also has a spring assembly 130 comprising a pair of compression springs 132 arranged between the respective end members 128 and the sensor holding arrangement 124.

Figure 17:
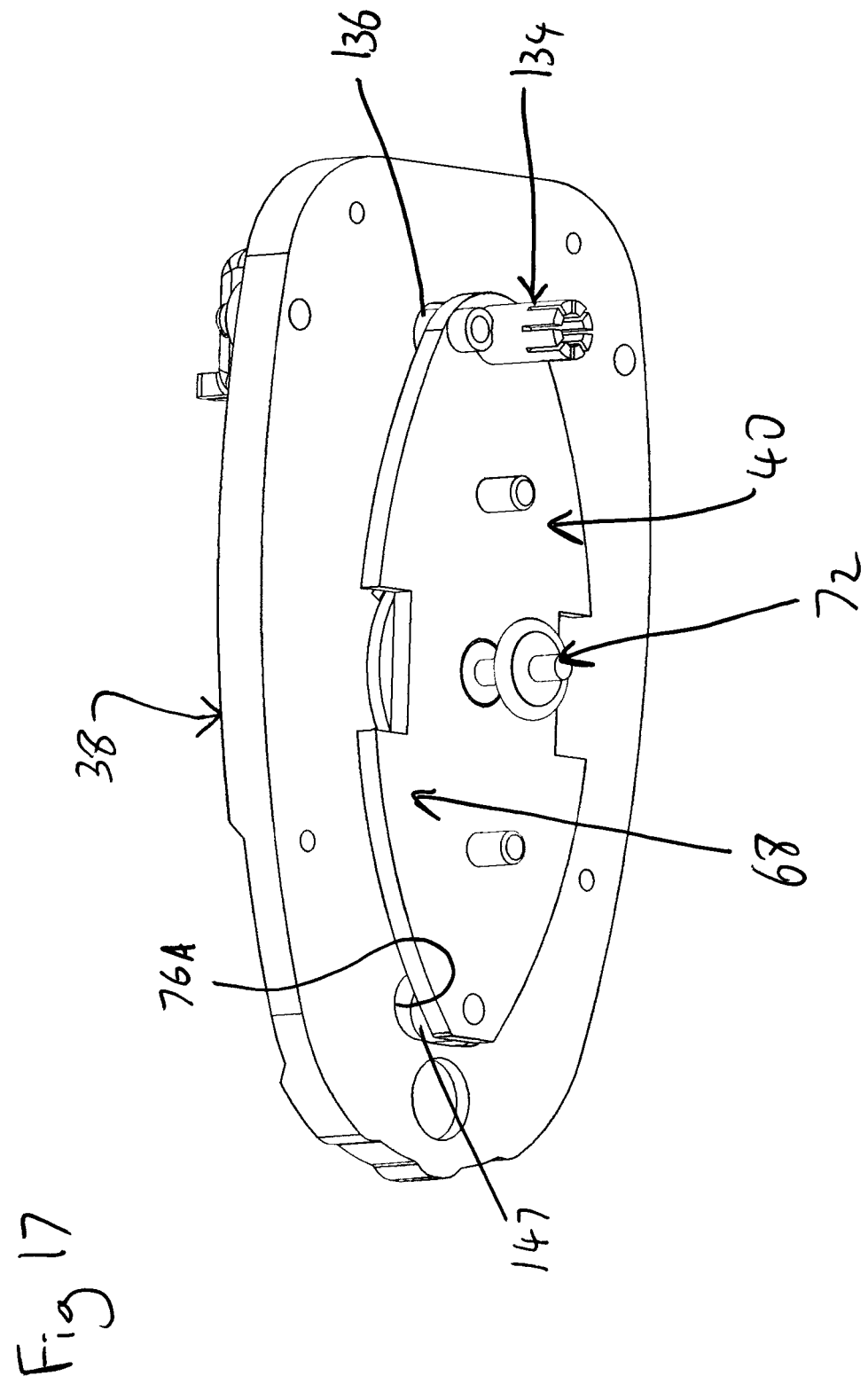
FIG. 17 is a bottom perspective view of the twisting mechanism.

Referring to FIGS. 17 and 18, the movable carrier arrangement 40 includes retaining means 134 for retaining the sensor holding arrangement 124 in a fixed position relative to the movable carrier arrangement 40. The retaining means 134 comprises a rear upstanding post member 136 extending upwardly from a rear region of the carrier member 68, through the rearward apertures 71C and 76C defined in the lower housing member 34 and in the upper base plate 38 respectively. The upstanding post member 136 extends to and is fixedly held by the sensor holding arrangement 124.

FIG. 18 shows an exploded view of the slide arrangement 121. The sensor holding arrangement 124 includes a main sliding portion 138 held between the opposite wall members 126 and a carrier portion 140 for carrying a component of a sensor arrangement 142. The sensor holding arrangement 124 further includes a pair of spring engaging members 139 arranged to engage opposite sides of the main sliding portion 138.

Each compression spring 132 urges the respective spring engaging member 139 away from the end member 128 engaged thereby. Each spring engaging member 139 is thus urged towards the centre of the guide means 122. The main sliding portion 138 is thus urged by the spring engaging members 139 to the centre of the guide means 122.

The main sliding portion 138 defines a cavity 138A which, in the embodiment shown is substantially cuboid in configuration. The cavity 138A can receive the rear upstanding post member 136 therein.

The upstanding post member 136 is a tight fit within the cavity 138A, and is thereby held securely by the main sliding portion 138.

The guide means 122 defines a rectangular space 123 between the wall members 126. The rectangular space is open at the top and bottom. The rectangular space 123 is configured to receive therein the sensor holding arrangement 124.

The guide means 122 includes first and second stop members 122A, 122B extending downwardly from each wall member 126. The first stop members 122A on each wall member 126 are aligned with each other. The second stop members 122B on each wall member 126 are also aligned with each other.

Each spring engaging member 139 has a pair of opposed substantially square planar elements 139A. The planar elements 139A are disposed adjacent to the wall members 126. A respective horizontally outwardly extending projection 139B is provided on the lower edge of each of the planar elements 139A. The projections 139B are arranged in a position to engage the first or second stop members 122A or 122B when the spring engaging members 139 are urged by the respective springs 132 towards the centre of the guide means 122.

The positions of the stop members 122A, 122B are selected so that the spring engaging members 139 are stopped by the stop members 122A, 122B when the main sliding portion 138 is centrally located within the guide means 122. The springs 132, the stop members 122A, 122B and the projections 139B constitute a return to zero arrangement for the twisting mechanism 14.

The sensor arrangement 142 comprises a first sensor component in the form of a magnet 144, which is mounted the carrier portion 140. The sensor arrangement 142 further includes a second sensor component in the form of a pair of Hall Effect chips 146 arranged on a component carrier plate 148 fixedly mounted on the upper base plate 38 beneath the magnet 144.

Figure 19:
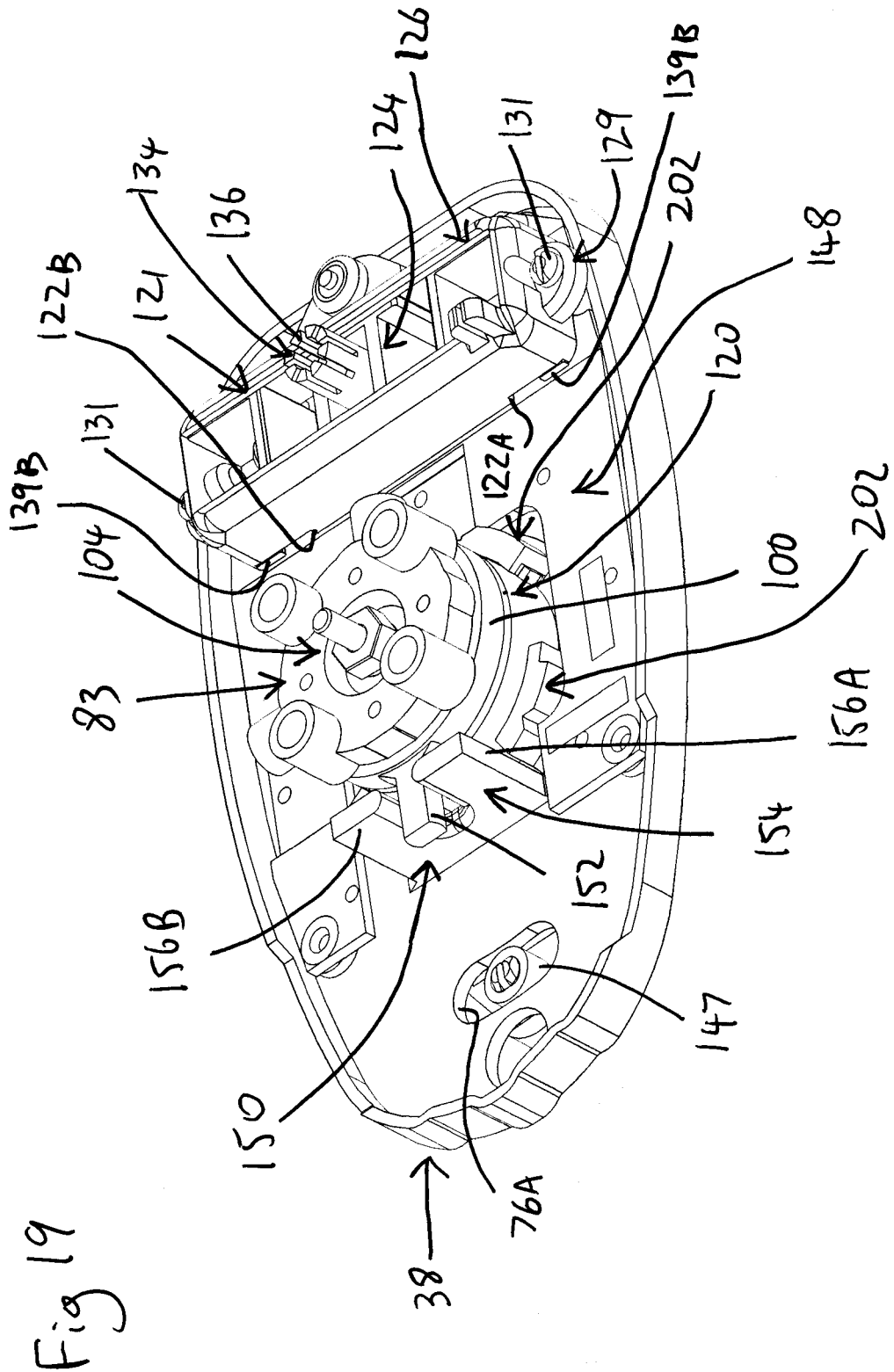
FIG. 19 is a perspective view from the front and top showing the twisting mechanism.
Figure 20:
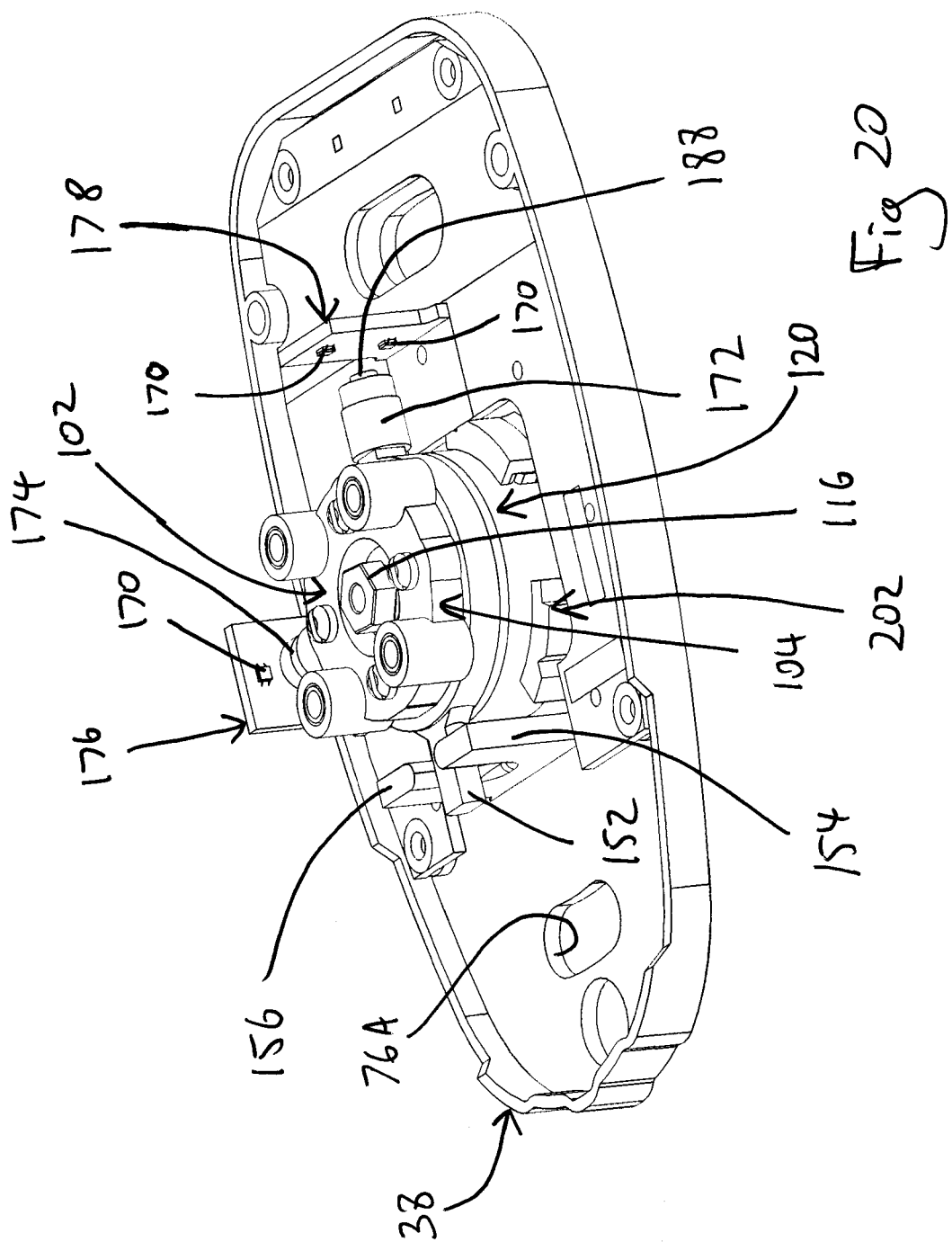
FIG. 20 is a perspective view from the side and top showing a tilting mechanism.
Figure 21:
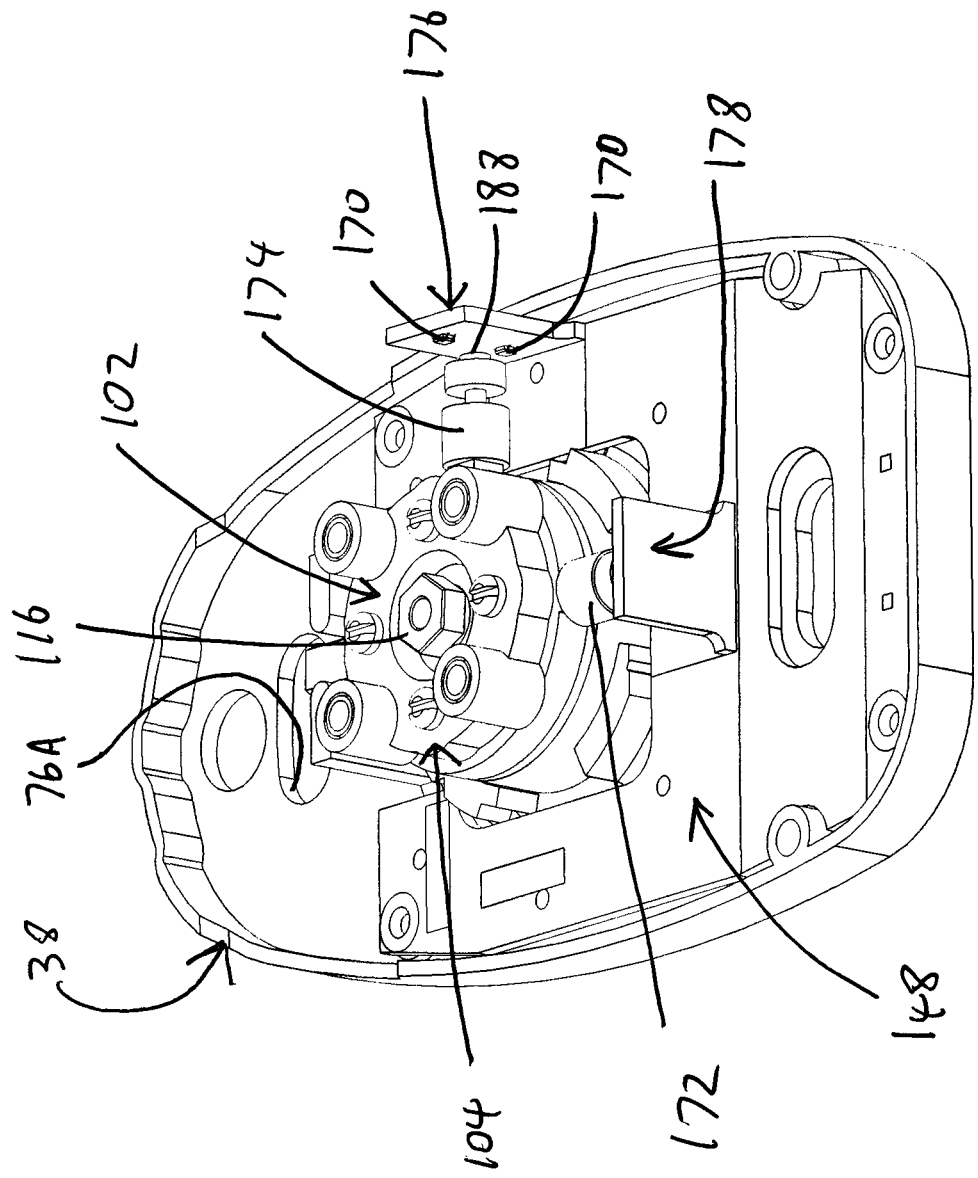
FIG. 21 is a perspective view from the rear showing the tilting mechanism.

The pivotal mounting of the second pivot means 102 on the first pivot means 100 allows the second pivot means 102 to twist relative to the first pivot means 100. As shown in FIG. 19, the second pivot means 102 includes a cooperating arrangement 150 between the second pivot means 102 and the upper base plate 38. The cooperating arrangement 150 comprises a forwardly extending projection 152 on the main part 106 of the upper pivot member 104, and a receiving means 154 to receive the projection 152.

In the embodiment shown, the receiving means 154 is in the form of an upwardly extending forked portion fixedly mounted on the upper base plate 38. The receiving means 154 comprises two forks 156A, 156B. The projection 152 is received between the two forks 156A, 156B. Twisting movement of the second pivot means 102 causes the projection 152 to engage one or other of the forks 156A, 156B. As a result of this engagement, the upper base plate 38 is twisted in the same direction as the twisting of the second pivot means 102.

The sensor holding arrangement 124 is held fixed relative to the movable carrier arrangement 40 of the panning mechanism 12, which means that as a result of the twisting movement of the upper base plate 38, the guide means 122 slides relative to the sensor holding arrangement 124 which causes the pair of Hall Effect chips 146 of the twisting mechanism 14 to move relative to the magnet 144. The signals created by this movement are transmitted to a display (not shown) of a computer (not shown) to effect twisting movement of an image on the display, as would be understood by those skilled in the art.

The extent by which the twisting mechanism 14 can twist is limited by the rear upstanding post member 136, which extends through the rear aperture 76C in the upper base plate 38. The rear upstanding post member 136 engages the ends of the rear aperture 76C at the limits of the twisting movement of the twisting mechanism 14. The length of the rear aperture 76C is selected to determine the extent to which the twisting mechanism 14 twists.

The twisting mechanism 14 also includes a front upstanding post member 147 extending upwardly from the movable carrier arrangement 40. The front upstanding post member 147 is received through the forward aperture 76A in the upper base plate 38. The function of the front upstanding post member 147 is the same as the function of the rear upstanding post member 136 described in the immediately preceding paragraph, i.e. to limit the twisting movement of the twisting mechanism 14.

The front upstanding post member 147 engages the ends of the front aperture 76A at the limits of the twisting movement of the twisting mechanism 14. The length of the front aperture 76A is therefore selected using the same criterion as used for selection of the length of the rear aperture 76C, i.e. to determine the extent to which the twisting mechanism 14 twists.

During twisting of the twisting mechanism 14, the upper base plate 38 pivots about the centre of the central aperture 76B defined therethrough.

The tilting mechanism 16 is shown in FIGS. 20 to 24, and comprises the pivot assembly 83 described above and two sensor arrangements, each comprising a first sensor component in the form of a magnet 188, and a second sensor component in the form of a pair of Hall Effect chips 170.

The second pivot member 104 includes first and second mutually perpendicular elongate projections 172, 174 which extend radially outwardly from the main part 106 of the second pivot member 104.

The magnet 188 of each of the two sensor arrangements 170 is mounted at the free end of a respective one of the projections 172, 174 (see FIG. 13). First and second upstanding members 176, 178 are provided on the component carrier plate 148. A respective one of the pair of Hall Effect chips 170 is mounted on each of the upstanding members 176, 178. The upstanding members 176, 178 are oriented perpendicularly to each other, and face a respective one of the projections 172, 174.

The upstanding members 176, 178 are provided on the component carrier plate 148, but it will be appreciated that they could be provided on the upper base plate 38.

Each of the projections 172, 174 defines a main axis which extends longitudinally through the projection 172, 174 and through the respective magnet 188. The first projection 172 can pivot about the axis through the second projection 174, and the second projection 174 can pivot about the axis through the first projection 172. Thus, the axis extending through the second projection 174 constitutes the tilt axis for the first projection 172. Similarly, the axis extending through the first projection 172 constitutes the tilt axis for the second projection 174.

As a result, when the second pivot means 102 is pivoted about the first pivot means 100 in a vertical direction, this movement causes tilting of one or both of the projections 172, 174 about its respective tilt axis. One of the benefits of a Hall Effect chip sensor is that it only detects increases or reduction in magnetic flux. The effect of this is that only motion of a magnet across a Hall Effect chip is sensed.

Thus, by tilting the upper housing member 18 so that the first projection 172 tilts about its tilt axis, the movement of the magnet 188 on the end of the first projection 172 is sensed by the pair of Hall Effect chips 170 on the first upstanding member 176. Similarly, by tilting the upper housing member 18 so that the second projection 174 tilts about its tilt axis, the movement of the magnet 188 on the end of the second projection 174 is sensed by the pair of Hall Effect chips 170 on the second upstanding member 178.

The movement sensed by the relevant pair of Hall Effect chips 170 causes signals to be transmitted by the Hall Effect chips 170. The signals so transmitted cause a corresponding tilting motion of the image on the display.

Figure 22:
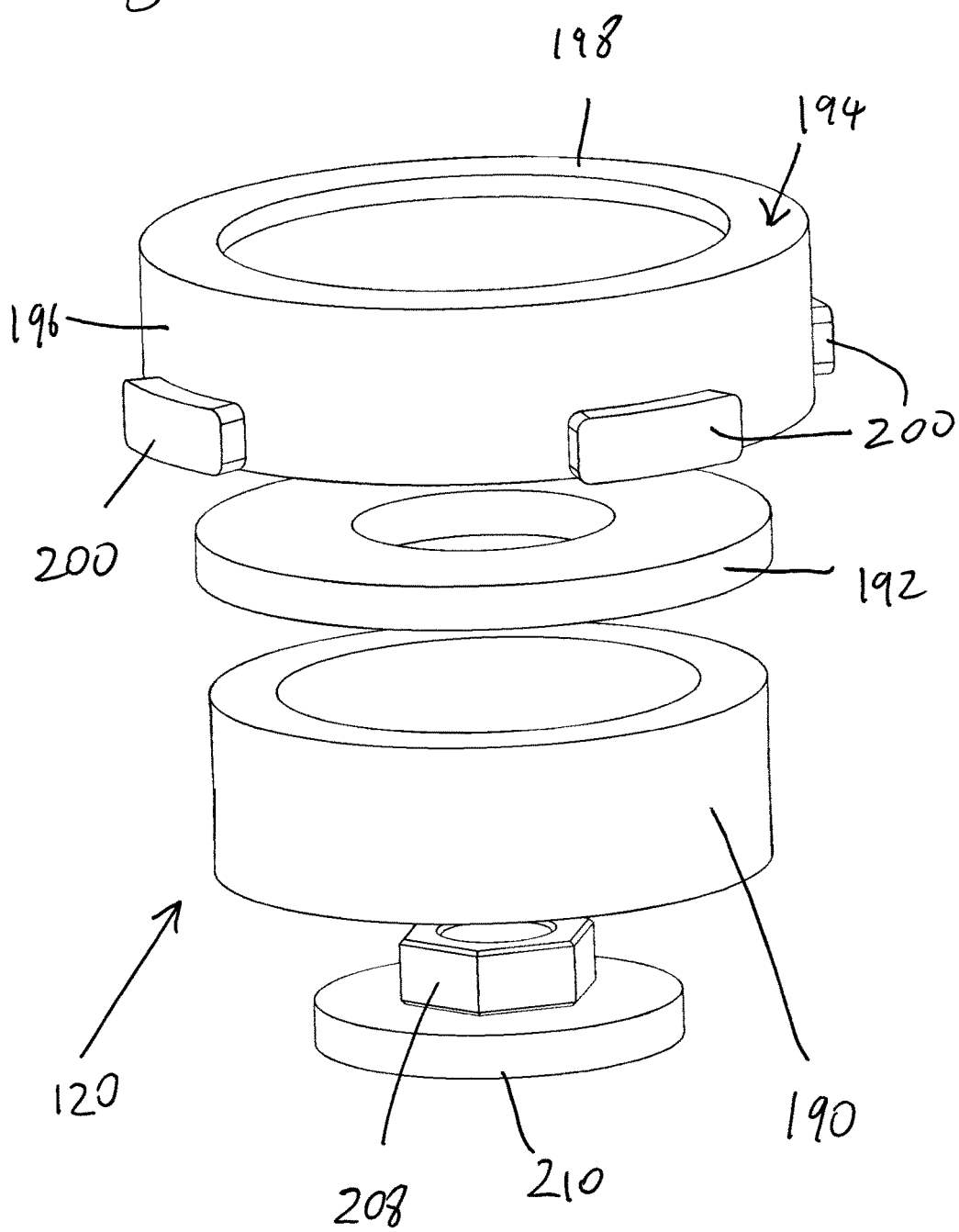
FIG. 22 shows a main spring arrangement.

The tilting of the upper housing 18 is allowed by the provision of the main spring arrangement 120, shown in FIG. 22. The main spring arrangement 120 comprises a main compression spring 190, shown diagrammatically in FIG. 22. The main spring arrangement 120 further includes an annular load spreading member 192 and a cylindrical cover member 194.

Figure 23:
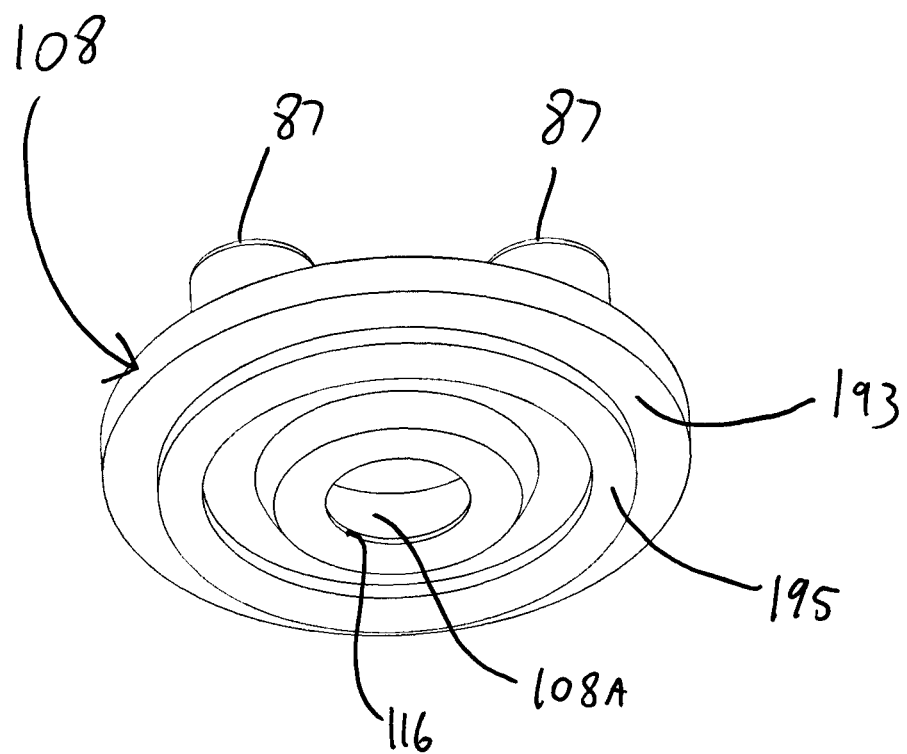
FIG. 23 is a view from below of the lower pivot member.

FIG. 23 is a view of the underside of the lower pivot member 108, showing a lower face 193 on which an annular projection 195 is provided. The annular projection 195 engages the annular load spreading member 192.

Figure 24:
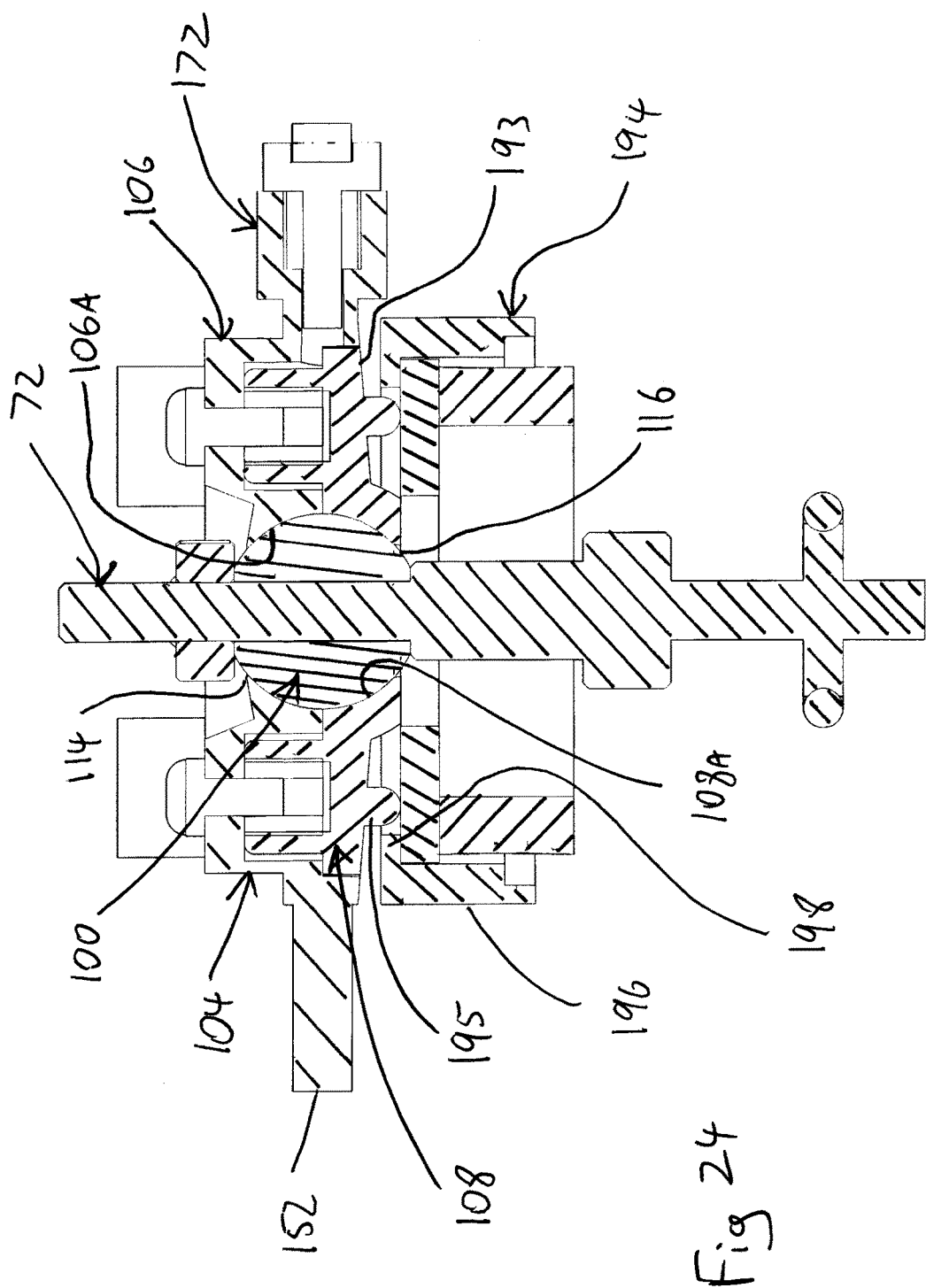
FIG. 24 is a sectional side view showing the pivot assembly and the main spring arrangement.

Referring to FIG. 24, when the upper housing 18 is tilted from its untilted position, a region of the annular projection 195 engages the annular load spreading member 192 and pushes downwardly thereon, thereby tilting the annular load spreading member 192 against the main compression spring 190 compressing the main compression spring 190.

The main compression spring 190 applies a reaction force against the annular load spreading member 192 to urge the annular load spreading member 192 back to its untilted position. The main compression spring 190 and the annular load spreading member 192 constitute a return to zero arrangement for the tilting mechanism 16.

The cylindrical cover member 194 comprises a cylindrical portion 196 and a radially inwardly extending flange portion 198 on the upper edge of the cylindrical portion 196.

When the upper housing 18 is tilted, a region of the lower face 193 engages the flange portion 198. The flange portion 198 thereby acts as a stop, limiting the extent to which the tilting mechanism can tilt.

Substantially rectangular projections 200 extend radially outwardly from the cylindrical portion 196. Referring to FIG. 8, the upper base plate 38 includes upwardly extending fastening formations 202 spaced from each other in a circular array around the central aperture 76B.

Each of the fastening formations 202 defines a recess 204 having an open end 206 to receive a respective one of the substantially rectangular projections 200. Each recess 204 also has a closed end 208. Thus, the cover member 194 can be secured to the upper base plate 38 by sliding the rectangular projections 200 into the recesses 204 in the fastening formations 202.

The upper base plate 38 includes a circular wall member 207 around, and spaced from the central aperture 76B in the upper base plate 38.

The main spring arrangement 120 further includes a nut 208 and a washer 210. The washer 210 can be received in the space between the wall member 207 and the central aperture 76B. The upper portion 75 of the elongate shaft member 72 can be inserted through the central aperture 76B, and secured to the upper base plate 38 by screwing the nut 208 onto a threaded region of the upper portion 75.

The upper portion 75 extends through the main spring arrangement 120, and is secured thereto by the pivot assembly 83. As described above, the pivot assembly 83 is secured to the upper portion 75 by means of the locking nut 117.

FIG. 25 is a sectional view showing the route of the PCB ribbon cable 67. The PCB ribbon cable 67 extends from an electrical component 200 on the upper base plate 38 to the upper post member 136A of the retaining means 134. The retaining means 134 is hollow to allow the PCB ribbon cable 67 to extend therethrough.

The upper post member 136A extends through the rear apertures 71C and 76C of the lower housing member 34 and of the upper base plate 38 respectively. The upper region 202 of the upper post member 136A defines a plurality of vertically extending slots 204, through one of which the PCB ribbon cable 67 extends to enter the hollow retaining means 134.

The lower region 206 of the lower post member 136B defines a further plurality of slots 208, through one of which the PCB ribbon cable extends to exit the retaining means 134 to be connected to a further electronic component (not shown) within the lower housing member 34.

The routing of the PCB cable through the rear apertures 71C, 76C via the retaining means 134 provides the advantage in the embodiment described herein that the PCB ribbon cable 67 is held clear of other components of the computer input device and therefore is less likely to become damaged.

There is thus described an embodiment of a computer input device 10 that has the functions of panning, twisting and tilting, all of which are isolated from each other. There is also described a panning mechanism 12 which provides the advantage that it is not affected by other movements of the computer input device 10. There is also described a twisting mechanism 14, the movement of which is unaffected by the movement of other functions. There is also described a tilting mechanism 16, the movement of which is unaffected by other modes of movement of the computer input device.

In the embodiment described above the twist axes and the tilt axes extend through the centre lines of the respective sensor arrangements.

A further advantages of the embodiment described above is that the computer input device allows single handed operation, with need for the use of a keyboard. It also allows simultaneous movement in any two or more axes.

Further, the provision of the raised portion 35A on the main housing portion 35 of the lower housing member 34 provides the advantage that the internal components are not visible during use and cannot be accessed through any gaps between the upper and lower housing members 18, 34 and the lower and upper base plates 36, 38. The upper base plate 38 is arranged on the raised portion 35A, thereby preventing internal access via the front central and rear apertures 71A, 71B and 71C. The skirt portion 19 of the upper housing member 18 extends over the wall 77 around the base portion 76 of the upper base plate 38, thereby preventing internal access via the front, central and rear apertures 76A, 76B, 76C in the base portion 76.

The upper housing member 18 is made to an ergonomic design so that it fits comfortably within the hollow of a user's hand.

The above described embodiment provides the advantage that it can be used in a variety of situations, such as: the control of a three dimensional computer environment; the control of a virtual object in computerised environment; the control of a real object in a real environment. The embodiment described herein can be used, for example, in the following situations: robotics, virtual reality, internet applications, CAD software products, unmanned vehicles, minimally invasive surgery, pigs for pipe inspection, and other situations.

The above described first embodiment is also suitable for use in playing computer games. In the computer input device 10, the provision of the panning mechanism 12, the twisting mechanism 14, and the tilting mechanism 16 provides an advantage in such use that the games can be played single handed.

Various modifications can be made without departing from the scope of the invention. For example, the number of the buttons can be varied as desired, or the buttons and/or the scroll wheel can be omitted. In a further modification, weights can be provided to determine the feel of the operation of the computer input device to the user. In one embodiment, the weight can be adjusted by the user. Alternatively, the weights and their position can be selected during manufacture.

The base plate 36 could be provided with a slip resistant lower surface, for example by providing a rubberised material on the lower surface.

Examples of further modifications are as follows. The side buttons 22 could be replaced by any other suitable input means. The scroll wheel could be replaced by a slider mechanism. The panning mechanism 12 could comprise three, five or more Hall Effect chips 48. The Hall Effect chips 48, 146 or 170 could be replaced by other types of sensing means, for example optical sensing means. The ribbon cable could extend through forward aperture 71A, or through the central aperture 71B. The aperture 71B could be in the shape of a circle, hexagon, or other suitable polygonal shape. The slide arrangement 121 could be provided at a front region rather than a rear region of the computer input device 10. The second guide pegs 70 can be provided on the lower base plate 36.

Figure 26:
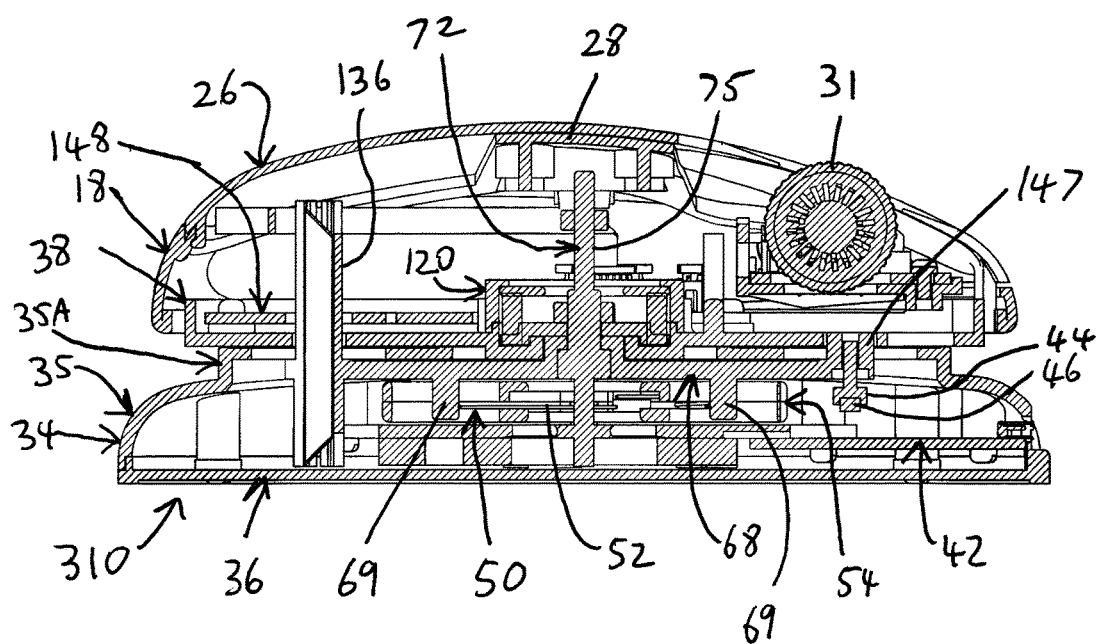
FIG. 26 is a sectional side view of a second embodiment of an input device.

FIGS. 26 and 27 show a second embodiment of the computer input device generally designated 310, which comprises the panning mechanism 12 described above. In this embodiment, the twisting mechanism and the tilting mechanisms are omitted. The computer input device 310 shown in FIGS. 26 and 27 is a two axis input device.

The panning mechanism 12 forming part of the computer input device 310 possesses many of the features of the panning mechanism 12 described with reference to FIGS. 3 to 11. These features of the panning mechanism 12 in the computer input device 310 have been designated with the same reference numerals in FIGS. 26 and 27 as the corresponding features in FIGS. 3 to 11. The features of the panning mechanism 12 of the computer input device 310 operate in the same way as the corresponding features of the computer input device 10.

Reference is therefore made to the paragraphs above describing the panning mechanism 12 of the computer input device 10 shown in FIGS. 3 to 11, which can be used to understand the panning mechanism 12 of the computer input device 310 shown in FIGS. 26 and 27.

In addition to the panning mechanism 12, the computer input device 310 comprises an upper housing member 18, which is the same as the upper housing member 18 of the computer input device 10, includes the same features and has the same function and purpose. A cover member 26 is attached to the upper housing member 18. The cover member 26 is the same as the cover member 26 of the computer input device 10, has the same features and has the same function and purpose. The upper housing member 18 is fixedly attached to the upper base plate 38, so that movement of the upper housing member 18 directly moves the upper base plate 38 to effect the panning motion.

The above described second embodiment of the computer input device 310 is suitable for use in playing computer games in combination with a standard computer mouse. In such applications, the computer input device 310 is used to effect panning motion on the screen, whereas the computer mouse can be used to effect motion about other axes.

The invention claimed is:

1. An input device comprising:
 a panning mechanism and a twisting mechanism;
 the panning mechanism comprising:
 a panning mechanism sensor arrangement having first and second panning mechanism sensor components;
 a movable carrier arrangement for carrying the first panning mechanism sensor component;
 a fixed carrier arrangement on which the second panning mechanism sensor component is mounted, the movable carrier arrangement being movable relative to the fixed carrier arrangement;
 and the panning mechanism further including constraining means to constrain movement of the movable carrier arrangement relative to the fixed carrier arrangement in two directions, whereby the movement of the movable carrier arrangement relative to the fixed carrier arrangement effects movement of the first panning mechanism sensor component relative to the second panning mechanism sensor component to create input signals;
 the twisting mechanism comprising:
 a support arrangement pivotally mounted on the movable carrier arrangement;
 a sensor holding arrangement;
 a twisting mechanism sensor arrangement comprising a first twisting mechanism sensor component held by the sensor holding arrangement and a second twisting mechanism sensor component on the support arrangement, whereby pivoting movement of the support arrangement relative to the movable carrier arrangement causes relative movement of the support arrangement and the sensor holding arrangement, and thereby effects movement of the first twisting mechanism sensor component relative to the second twisting mechanism sensor component to create further input signals;
 wherein the twisting mechanism further includes a slide arrangement to effect relative sliding movement between the support arrangement and the sensor holding arrangement,
 wherein the constraining means is configured to constrain movement of the movable carrier arrangement relative to the fixed carrier arrangement in two substantially perpendicular directions;
 wherein the constraining means comprises a guide arrangement having two guide ways for guiding movement of the movable carrier arrangement relative to the fixed carrier arrangement, the guide ways being substantially perpendicular to each other, and
 wherein the movable carrier arrangement includes a guide member configured to cooperate with one of the guide ways, and a further guide member configured to cooperate with the other of the guide ways.

2. The input device according to claim 1, wherein the movable carrier arrangement comprises a pair of guide members cooperable with one of the guide ways, and the fixed carrier arrangement comprises a pair of further guide members cooperable with the further guide ways; and
 wherein the panning mechanism comprises a housing and a base member;
 wherein the movable carrier arrangement and the fixed carrier arrangement are housed in the housing; and
 wherein each further guide member is provided on the housing or base member.

3. The input device according to claim 1, wherein the movable carrier arrangement comprises a substantially flat carrier member, and the, or each, guide member extends from the carrier member;
 wherein the constraining means comprises a plurality of urging members operable on the, or each, guide member to urge the movable carrier arrangement to a substantially central position relative to the fixed carrier arrangement, the central position of the movable carrier arrangement relative to the fixed carrier arrangement being a position where the first panning mechanism sensor component is located substantially centrally over the second panning mechanism sensor component; and
 wherein the constraining means comprises a holder to hold the urging members, each urging member being operable between the holder and the, or a respective one of the, guide members.

4. The input device according to claim 3, wherein the movable carrier arrangement further includes a projecting arrangement and further urging members are located beneath the holder, the further urging members being operable on the projecting arrangement, and the projecting arrangement comprises an elongate portion and a substantially circular member, the circular member being engagable with the further urging members to urge the projecting arrangement and the movable carrier arrangement to the aforesaid central position.

5. An input device comprising:
 a panning mechanism and a twisting mechanism;
 the panning mechanism comprising:
 a panning mechanism sensor arrangement having first and second panning mechanism sensor components;
 a movable carrier arrangement for carrying the first panning mechanism sensor component;
 a fixed carrier arrangement on which the second panning mechanism sensor component is mounted, the movable carrier arrangement being movable relative to the fixed carrier arrangement;
 and the panning mechanism further including constraining means to constrain movement of the movable carrier arrangement relative to the fixed carrier arrangement in two directions, whereby the movement of the movable carrier arrangement relative to the fixed carrier arrangement effects movement of the first panning mechanism sensor component relative to the second panning mechanism sensor component to create input signals;
 the twisting mechanism comprising:
 a support arrangement pivotally mounted on the movable carrier arrangement;
 a sensor holding arrangement;
 a twisting mechanism sensor arrangement comprising a first twisting mechanism sensor component held by the sensor holding arrangement and a second twisting mechanism sensor component on the support arrangement, whereby pivoting movement of the support arrangement relative to the movable carrier arrangement causes relative movement of the support arrangement and the sensor holding arrangement, and thereby effects movement of the first twisting mechanism sensor component relative to the second twisting mechanism sensor component to create further input signals;
wherein the twisting mechanism further includes a slide arrangement to effect relative sliding movement between the support arrangement and the sensor holding arrangement,
including a support arrangement and an elongate shaft member extending upwardly from the movable carrier arrangement, the elongate shaft member extending through a main aperture in the support arrangement, said support arrangement being disposed above the movable carrier arrangement;
wherein the input device further includes a substantially circular stop member on the elongate shaft member to engage the edge of the aperture in the support arrangement, thereby providing a limit to the extent of movement of the movable carrier arrangement.

6. An input device comprising:
a panning mechanism and a twisting mechanism;
the panning mechanism comprising:
a panning mechanism sensor arrangement having first and second panning mechanism sensor components;
a movable carrier arrangement for carrying the first panning mechanism sensor component;
a fixed carrier arrangement on which the second panning mechanism sensor component is mounted, the movable carrier arrangement being movable relative to the fixed carrier arrangement;
and the panning mechanism further including constraining means to constrain movement of the movable carrier arrangement relative to the fixed carrier arrangement in two directions, whereby the movement of the movable carrier arrangement relative to the fixed carrier arrangement effects movement of the first panning mechanism sensor component relative to the second panning mechanism sensor component to create input signals;
the twisting mechanism comprising:
a support arrangement pivotally mounted on the movable carrier arrangement;
a sensor holding arrangement;
a twisting mechanism sensor arrangement comprising a first twisting mechanism sensor component held by the sensor holding arrangement and a second twisting mechanism sensor component on the support arrangement, whereby pivoting movement of the support arrangement relative to the movable carrier arrangement causes relative movement of the support arrangement and the sensor holding arrangement, and thereby effects movement of the first twisting mechanism sensor component relative to the second twisting mechanism sensor component to create further input signals;
wherein the twisting mechanism further includes a slide arrangement to effect relative sliding movement between the support arrangement and the sensor holding arrangement,
wherein the slide arrangement comprises a guide assembly on the support arrangement, the sensor holding arrangement being guided by the guide assembly; and
wherein the guide assembly and the sensor holding arrangement can slide relative to each other.

7. An input device comprising:
a panning mechanism and a twisting mechanism;
the panning mechanism comprising:
a panning mechanism sensor arrangement having first and second panning mechanism sensor components;
a movable carrier arrangement for carrying the first panning mechanism sensor component;
a fixed carrier arrangement on which the second panning mechanism sensor component is mounted, the movable carrier arrangement being movable relative to the fixed carrier arrangement;
and the panning mechanism further including constraining means to constrain movement of the movable carrier arrangement relative to the fixed carrier arrangement in two directions, whereby the movement of the movable carrier arrangement relative to the fixed carrier arrangement effects movement of the first panning mechanism sensor component relative to the second panning mechanism sensor component to create input signals;
the twisting mechanism comprising:
a support arrangement pivotally mounted on the movable carrier arrangement;
a sensor holding arrangement;
a twisting mechanism sensor arrangement comprising a first twisting mechanism sensor component held by the sensor holding arrangement and a second twisting mechanism sensor component on the support arrangement, whereby pivoting movement of the support arrangement relative to the movable carrier arrangement causes relative movement of the support arrangement and the sensor holding arrangement, and thereby effects movement of the first twisting mechanism sensor component relative to the second twisting mechanism sensor component to create further input signals;
wherein the twisting mechanism further includes a slide arrangement to effect relative sliding movement between the support arrangement and the sensor holding arrangement,
wherein the movable carrier arrangement includes a retaining member for retaining the sensor holding arrangement in a substantially fixed position relative to the movable carrier arrangement;
wherein the retaining member comprises an elongate post member extending from the movable carrier arrangement to the sensor holding arrangement, the support arrangement defining a first aperture through which the elongate post member can extend from the movable carrier arrangement; and
wherein the movable carrier arrangement includes a further elongate post member extending from the movable carrier arrangement to the support arrangement, the support arrangement defining a second aperture through which the further elongate post member can extend.

8. The input device according to claim 7, wherein the first and second apertures are in the shape of curved slots, said curves corresponding substantially to arcs of a circle or to arcs of concentric circles; and
wherein the main aperture is defined at the center of the aforesaid circle or concentric circles, and an elongate shaft member extends from the movable carrier arrangement through the main aperture defined in the support arrangement.

9. An input device comprising:
a panning mechanism and a twisting mechanism;
the panning mechanism comprising:
a panning mechanism sensor arrangement having first and second panning mechanism sensor components;
a movable carrier arrangement for carrying the first panning mechanism sensor component;
a fixed carrier arrangement on which the second panning mechanism sensor component is mounted, the movable carrier arrangement being movable relative to the fixed carrier arrangement;
and the panning mechanism further including constraining means to constrain movement of the movable carrier arrangement relative to the fixed carrier arrangement in two directions, whereby the movement of the movable carrier arrangement relative to the fixed carrier arrangement effects movement of the first panning mechanism sensor component relative to the second panning mechanism sensor component to create input signals;
the twisting mechanism comprising:
a support arrangement pivotally mounted on the movable carrier arrangement;
a sensor holding arrangement;
a twisting mechanism sensor arrangement comprising a first twisting mechanism sensor component held by the sensor holding arrangement and a second twisting mechanism sensor component on the support arrangement, whereby pivoting movement of the support arrangement relative to the movable carrier arrangement causes relative movement of the support arrangement and the sensor holding arrangement, and thereby effects movement of the first twisting mechanism sensor component relative to the second twisting mechanism sensor component to create further input signals;
wherein the twisting mechanism further includes a slide arrangement to effect relative sliding movement between the support arrangement and the sensor holding arrangement,
wherein the slide arrangement comprises an urging assembly for urging the sensor holding arrangement and the guide assembly relative to each other so that the sensor holding arrangement is substantially centrally located in a central position within the guide assembly, the urging assembly being cooperable with the guide assembly and with the sensor holding arrangement to urge the sensor holding arrangement and the guide assembly relative to each other to the central position.

10. The input device according to claim 9, wherein the guide assembly comprises opposite wall members, the sensor holding arrangement and the urging assembly being disposed between the opposite wall members; and
wherein the guide assembly further includes end members, the urging assembly extending from the end members to the sensor holding arrangement, and the urging assembly comprises a pair of springs, each extending from a respective end member to the sensor holding arrangement.

11. The input device according to claim 9, wherein the sensor holding arrangement comprises a main sliding portion held within the guide assembly, and a carrier portion for carrying the first twisting mechanism sensor component of the twisting mechanism sensor arrangement, the carrier portion extending externally of the guide assembly;
wherein the sensor holding arrangement further includes a pair of spring engaging members for engaging the springs, the spring engaging members being arranged within the guide assembly on opposite sides of the main sliding portion; and
wherein the sensor holding arrangement includes stop members on the spring engaging members, the stop members being received in slots or recesses defined by the guide assembly, the slots or recesses having end members to engage the stop members, and preventing movement of the stop members beyond the end portions.

12. An input device comprising:
a panning mechanism and a twisting mechanism;
the panning mechanism comprising:
a panning mechanism sensor arrangement having first and second panning mechanism sensor components;
a movable carrier arrangement for carrying the first panning mechanism sensor component;
a fixed carrier arrangement on which the second panning mechanism sensor component is mounted, the movable carrier arrangement being movable relative to the fixed carrier arrangement;
and the panning mechanism further including constraining means to constrain movement of the movable carrier arrangement relative to the fixed carrier arrangement in two directions, whereby the movement of the movable carrier arrangement relative to the fixed carrier arrangement effects movement of the first panning mechanism sensor component relative to the second panning mechanism sensor component to create input signals;
the twisting mechanism comprising:
a support arrangement pivotally mounted on the movable carrier arrangement;
a sensor holding arrangement;
a twisting mechanism sensor arrangement comprising a first twisting mechanism sensor component held by the sensor holding arrangement and a second twisting mechanism sensor component on the support arrangement, whereby pivoting movement of the support arrangement relative to the movable carrier arrangement causes relative movement of the support arrangement and the sensor holding arrangement, and thereby effects movement of the first twisting mechanism sensor component relative to the second twisting mechanism sensor component to create further input signals;
wherein the twisting mechanism further includes a slide arrangement to effect relative sliding movement between the support arrangement and the sensor holding arrangement,
wherein the twisting mechanism further includes a pivot assembly, which comprises an upstanding member on the movable carrier arrangement, and the pivot assembly comprises a first pivot means on the upstanding member and a second pivot means pivotally mounted on the first pivot means, the second pivot means being configured to receive the first pivot means.

13. The input device according to claim 12, wherein the first pivot means comprises a substantially spherical member, and wherein the second pivot means comprises upper and lower pivot members secured to each other to hold the first pivot means; and
wherein each of the upper and lower pivot members defines a respective recess, the recesses being aligned with each other when the upper and lower pivot members are secured to each other, whereby a space is defined by the upper and lower pivot members to receive the first pivot means.

14. The input device according to claim 12, including a cooperating arrangement between the second pivot means and the support arrangement, whereby pivoting movement of the second pivot means relative to the movable carrier arrangement effects corresponding movement of the support arrangement relative to the movable carrier arrangement;

wherein the cooperating arrangement comprises a projection on the second pivot means and receiving means on the support arrangement to receive the projection, whereby twisting movement of the second pivot means causes the projection to engage the receiving means to effect twisting motion of the support arrangement.

15. An input device comprising:
a panning mechanism and a twisting mechanism;
the panning mechanism comprising:
a panning mechanism sensor arrangement having first and second panning mechanism sensor components;
a movable carrier arrangement for carrying the first panning mechanism sensor component;
a fixed carrier arrangement on which the second panning mechanism sensor component is mounted, the movable carrier arrangement being movable relative to the fixed carrier arrangement;
and the panning mechanism further including constraining means to constrain movement of the movable carrier arrangement relative to the fixed carrier arrangement in two directions, whereby the movement of the movable carrier arrangement relative to the fixed carrier arrangement effects movement of the first panning mechanism sensor component relative to the second panning mechanism sensor component to create input signals;
the twisting mechanism comprising:
a support arrangement pivotally mounted on the movable carrier arrangement;
a sensor holding arrangement;
a twisting mechanism sensor arrangement comprising a first twisting mechanism sensor component held by the sensor holding arrangement and a second twisting mechanism sensor component on the support arrangement, whereby pivoting movement of the support arrangement relative to the movable carrier arrangement causes relative movement of the support arrangement and the sensor holding arrangement, and thereby effects movement of the first twisting mechanism sensor component relative to the second twisting mechanism sensor component to create further input signals;
wherein the twisting mechanism further includes a slide arrangement to effect relative sliding movement between the support arrangement and the sensor holding arrangement,
comprising a stop arrangement to limit the twisting movement of the twisting mechanism, the stop arrangement comprising an aperture defined in the support arrangement.

16. The input device according to claim 15, wherein the stop arrangement comprises two apertures defined in the support arrangement, one of the apertures being defined at a forward region of the support arrangement, and the other of the apertures being defined at a rear region of the support arrangement.

17. The input device according to claim 1 comprising a tilting mechanism, the tilting mechanism comprising a pivot assembly, and two tilting mechanism sensor arrangements, each tilting mechanism sensor arrangement comprising first and second tilting mechanism sensor components, the first tilting mechanism sensor components being mounted on the pivot assembly so that the first tilting mechanism sensor components face in two respective directions;
wherein the tilting mechanism further includes a support arrangement for supporting the second tilting mechanism sensor components; and
wherein the first tilting mechanism sensor components define respective tilt axes, whereby pivoting motion of the pivot assembly about one of the tilt axes effects linear motion of the other first tilting mechanism sensor component relative to the respective second tilting mechanism sensor component to create input signals.

* * * * *